US006159095A

United States Patent [19]

Frohm et al.

[11] Patent Number: 6,159,095

[45] Date of Patent: Dec. 12, 2000

[54] VIDEO GAMING DEVICE HAVING MULTIPLE STACKING FEATURES

[75] Inventors: Erica A. Frohm, Evanston, Ill.; John J. Giobbi, Crown Point, Ind.; Joel R. Jaffe, Evanston, Ill.

[73] Assignee: WMS Gaming Inc., Chicago, Ill.

[21] Appl. No.: 09/447,109

[22] Filed: Nov. 22, 1999

Related U.S. Application Data

[63] Continuation-in-part of application No. 09/392,980, Sep. 9, 1999.

[51] Int. Cl.[7] .................................... A63F 13/00

[52] U.S. Cl. ............................ 463/19; 463/13; 463/20; 273/269

[58] Field of Search ............................ 463/16, 17, 18, 463/19, 20, 21, 27, 12, 13; 273/143 R, 273, 293

[56] References Cited

U.S. PATENT DOCUMENTS 4,798,387 1/1989 Richardson ............................ 273/237
5,356,140 10/1994 Dabrowski et al. .
5,531,441 7/1996 Dabrowski et al. ...................... 463/12
5,573,249 11/1996 Johnson .
5,639,092 6/1997 Macaisa .
5,722,891 3/1998 Inoue ........................................ 463/20
5,823,873 10/1998 Moody ...................................... 463/13
5,830,063 11/1998 Byrne ........................................ 463/18
5,951,397 9/1999 Dickinson ................................. 463/36
5,967,895 10/1999 Kellen ....................................... 463/19
5,997,401 12/1999 Crawford ................................. 463/20

*Primary Examiner*—Valencia Martin-Wallace
*Assistant Examiner*—Julie Kasick
*Attorney, Agent, or Firm*—Jenkens & Gilchrist

[57] ABSTRACT

An electronic video gaming machine for playing multiple games is set forth. The gaming machine includes a first set of game elements for playing a game having a plurality of possible game outcomes. A first game outcome is selected from a plurality of possible game outcomes including at least one predetermined carry-over outcome. The carry-over outcome occurring in the first game outcome is automatically duplicated by the processor into at least one other game outcome. Game elements of the first game outcome are also manually selectable by a player and the selected game elements are duplicated by the processor into at least one other game outcome. Multiple game elements are shown on game boards arranged in a stack and displayed on a touch screen. The stack includes a top end and a bottom end and each game board has a face on which a single game is displayed. A plurality of game control buttons and game control indicators are provided for operating the game and selecting game elements, such as lucky numbers, random numbers, and bingo patterns, to be applied to each game board in the stack. A number of game boards to be played in the stack is selectable by the player and a winning game board is indicated to the player such that the winning game board appears to pop-up from the stack in cash-register-like fashion such that the face of the winning game board is more visible relative to prior said game board popping up. The face of any game board is viewable by the player by touching the touch screen at a location of the game board to be viewed. After touching the game board, the game board slides out from the stack to expose its face.

76 Claims, 11 Drawing Sheets

*Fig. 8*

238

| WIN COMB | | | | | PAY |
|---|---|---|---|---|---|
| FG | FG | FG | FG | FG | 2500 |
| FG | FG | FG | FG | | 800 |
| FG | FG | FG | | | 100 |
| FG | FG | | | | 20 |
| FG | | | | | 2 |
| FB | FB | FB | FB | FB | 1000 |
| FB | FB | FB | FB | | 200 |
| FB | FB | FB | | | 50 |
| FB | FB | | | | 10 |
| FB | | | | | 2 |
| FS | FS | FS | FS | FS | 500 |
| FS | FS | FS | FS | | 100 |
| FS | FS | FS | | | 25 |
| FS | FS | | | | 5 |
| FS | | | | | 2 |
| BL | BL | BL | BL | BL | 250 |
| BL | BL | BL | BL | | 100 |
| BL | BL | BL | | | 25 |
| ML | ML | ML | ML | ML | 200 |
| ML | ML | ML | ML | | 80 |
| ML | ML | ML | | | 20 |
| PL | PL | PL | PL | PL | 150 |
| OR | OR | OR | OR | OR | 100 |
| OR | OR | OR | OR | | 40 |
| OR | OR | OR | | | 10 |
| CH | CH | CH | CH | CH | 50 |
| CH | CH | CH | CH | | 20 |
| CH | CH | CH | | | 5 |
| 3 WM LURES | | | | | 3 |
| 3 FISH LURES | | | | | 3 |
| 5 FLY LURES | | | | | 100 |
| 4 FLY LURES | | | | | 25 |
| 3 FLY LURES | | | | | 3 |
| 3 FLY LURES | | | | | 3 |
| 3 FLY LURES | | | | | 3 |

VIDEO GAMING DEVICE HAVING MULTIPLE STACKING FEATURES

RELATED APPLICATION

This application is a continuation-in-part of U.S. patent application Ser. No. 09/392,980, filed Sep. 9, 1999.

FIELD OF THE INVENTION

The present invention relates generally to gaming machines and, more particularly, to video gaming machines for playing multiple games simultaneously.

BACKGROUND OF THE INVENTION

Video gaming machines are well known in the art and many types of electronic video gaming machines have been developed. These machines are microprocessor-based and, in the event of a displayed winning combination of game elements, pay out either in the form of credits accumulated in the machine or in negotiable currency. One common type of video gaming machine is a video poker machine designed to replicate the play of a hand of poker. Typically, the player is not playing against any other players or against a dealer's hand, but the player is simply attempting to achieve the highest ranking poker hand possible from the cards displayed to the player. The higher the poker hand achieved by the player, the greater the player's winnings. Some of the card games adapted to electronic video gaming machines display both the player's hand and a dealer's hand. This occurs in those games, including poker, where the player must beat the dealer in order to win.

In some of the electronic video gaming machines, the player receives only a single hand from the electronic deck of cards. If the player receives an initial deal of poor cards, the player feels that his chances of winning are greatly reduced because the possibility of improving his hand by discarding and receiving replacement cards is not good. To increase the opportunity to win, players prefer to play multiple hands at the same time. Playing multiple hands increases the chance of at least one of the hands turning-up a winning combination. As a result, a player will perceive a better chance of winning and continue playing the machine.

The electronic video medium lends itself more readily to providing simultaneous multiple game play for some games more than others. While simultaneous multiple game play may be adapted to all types of poker games and other card games such as Twenty-One or Blackjack, it can be adapted for other games as well. For example, an electronic video gaming machine is particularly suited for the game of Bingo, especially since, in conventional non-electronic Bingo, players prefer to play with several game boards at the same time to increase their chances of winning. Such use by players of more than one game board is also advantageous to the game operator in that a charge is collected for each board used. These advantages are also carried over in video gaming versions.

In addition to the simultaneous play of multiple games, several other advantages that are capable of attracting players are appreciated in video versions. For example, in conventional Bingo, the use of many boards by a single player takes up space which might be used to accommodate another player. Further, the use of many such boards by a single player can slow the overall program to the discontent of other players. In addition, many players would like to play with more boards but are limited by their own dexterity and inability to see and follow more than one or two boards.

Also, it is desirable for the player to have the ability to have the shape of a winning array promptly displayed on the board and to be provided with an automatic indication of when that array has been achieved. Not only are all of these problems solved by using electronic video gaming machines, but also, video gaming machines are capable of providing the player with additional features that increase the entertainment value of the machine and attract frequent play.

Electronic video gaming machines provide definite advantages for the player and casino operator over traditional versions. This is especially true for electronic video machines having the capability of playing multiple games at the same time. Because of these advantages in player appeal and excitement relative to traditional non-video versions, there is a continuing need for gaming machine manufacturers to produce new types of games and attractive enhancements.

SUMMARY OF THE INVENTION

An electronic video gaming machine for playing multiple games is set forth. The gaming machine includes a first set of game elements for playing a game having a plurality of possible game outcomes. A first game outcome is selected from a plurality of possible game outcomes including at least one predetermined carry-over outcome. The carry-over outcome occurring in the first game outcome is automatically duplicated by the processor into at least one other game outcome. Game elements of the first game outcome are also manually selectable by a player and the selected game elements are duplicated by the processor into at least one other game outcome. Multiple game elements are shown on game boards arranged in a stack and displayed on a touch screen. The stack includes a top end and a bottom end and each game board has a face on which a single game is displayed. A plurality of game control buttons and game control indicators are provided for operating the game and selecting game elements, such as lucky numbers, random numbers, and bingo patterns, to be applied to each game board in the stack. A number of game boards to be played in the stack is selectable by the player and a winning game board is indicated to the player such that the winning game board appears to pop-up from the stack in cash-register-like fashion such that the face of the winning game board is more visible relative to prior said game board popping up. The face of any game board is viewable by the player by touching the touch screen at a location of the game board to be viewed. After touching the game board, the game board slides out from the stack to expose its face.

BRIEF DESCRIPTION OF THE DRAWINGS

The foregoing and other advantages of the invention will become apparent upon reading the following detailed description and upon reference to the drawings in which:

FIG. 8 is a pay table for various winning combinations which may occur in a reel-type slot game;

Figure 1:
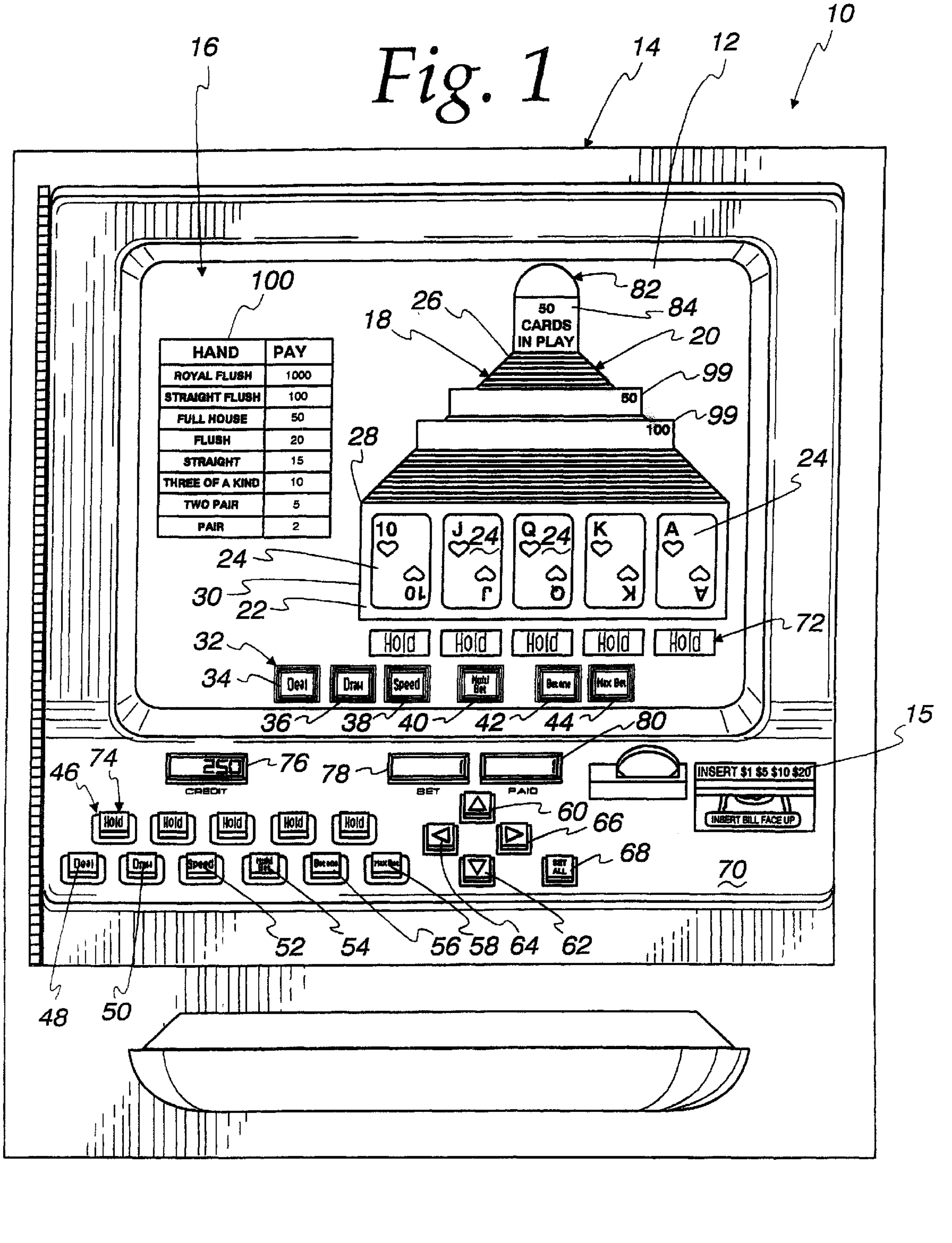
FIG. 1 is an illustration of a video gaming machine showing a "play mode" display for a poker game.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is illustrated a video gaming machine 10 having a video screen 12 secured within a housing 14. Within the housing 14 is located a processor-based circuit (not shown) which includes appropriate components and circuitry to operate the video gaming machine 10. Game play is generally initiated by inserting a number of coins via a monetary input device 15 or playing a number of credits.

In one embodiment of the invention as shown in FIG. 1, a poker game in "play mode" is displayed on the video screen 12. Included on a "play-mode" display 16 is a depiction of a stack 18 of game boards 20 for playing multiple game boards 20 substantially simultaneously. The game boards 20 can be played individually or may be interlinked in some manner such that at least one game board 20 has an effect on other game boards 20. For example, to interlink the game boards 20 in a draw version of poker, cards selected to be held in one hand of a game board 20 are also held in the remaining hands of other game boards 20.

Each game board 20 includes a face 22 that displays cards 24 of a single hand of a five-card poker game, for example. The stack 18 is shown on the video screen 12 in a generally three-dimensional top-perspective view such that game boards 20 located at a bottom end 26 of the stack 18 are smaller relative to boards located towards a top end 28 of the stack 18 and such that the entire face 22 of a topmost game board 30 is visible while other game boards 20 in the stack 18 are substantially hidden.

To control the basic operation of the game, the video screen 12 may be a touch screen for additionally displaying appropriate game control buttons or indicators 32, such as a "deal" indicator 34, a "draw" indicator 36, a "speed" indicator 38, a "multi-bet" indicator 40, a "bet one" indicator 42, and a "max bet" indicator 44. However, sometimes players may prefer to use game control buttons 46 mounted on the housing 14 instead of the touch screen indicators 32. To that end, the machine includes appropriate game control buttons 46 such as a "deal" button 48, a "draw" button 50, a "speed" button 52, a "multi-bet" button 54, a "bet one" button 56, a "max bet" button 58, an "up-arrow" button 60, a "down-arrow" button 62, a "left arrow" button 64, a "right arrow" button 66 and a "set all" button 68 on a deck portion 70 of the machine housing 14. If the game is a draw version of poker, the machine accepts game control inputs either from the touch screen 12 with the "hold" indicators 72 or "hold" buttons 74 on the deck 70. The experienced player can play the poker game faster by using the buttons 46 which will tend to increase the player's enjoyment of the game while at the same time increase the potential earnings of the machine 10. On the other hand, the less experienced players can use the touch screen 12 to control the game which can increase the player's enjoyment of the game and may encourage further play. The display 16 and/or deck portion 70 further include a credit window 76 showing the number of credits available for play, a bet window 78 showing the number of credits bet on the current game, and a paid window 80 showing the number of credits won in the last game.

The "play-mode" display 16 further includes a stack tab 82 for selecting the number of game boards 20 to be played. The stack tab 82 is movable up and down the stack 18 either via the touch screen 12 or by the "up-arrow" button 60 or "down-arrow" button 62 located on the deck 70 of the machine 10. For example, by pressing the "up-arrow" button 60, the player increases the number of game boards 20 to be played; and by pressing the "down-arrow" button 62 the player decreases the number of game boards 20 to be played. If the player uses the touch screen 12 to move the stack tab 82, the player touches a finger to the touch screen 12 at the stack tab 82 and drags the finger along the touch screen 12 to select a desired number of game boards 20. To maintain a three-dimensional look, the stack tab 82 varies in size as it is moved along the stack 18. In particular, the stack tab 82 appears larger the closer it is to the top end 28 relative to the bottom end 26 of the stack 18. The stack tab 82 includes a counter 84 which displays a total number of game boards 20 in the stack 18. As the stack tab 82 is moved along the length of the stack 18, the total number of game boards 20 displayed by the counter 84 changes accordingly to reflect the number of game boards 20 in the stack 18.

The "bet one" indicator 42 or button 56 is used by the player to select the number of coins or credits to be wagered, or a bet amount. With each press of the "bet one" button 56 or touch of the "bet one" indicator 42, the bet amount is incremented by a predetermined amount and displayed on the bet window 78 on the deck 70. Thereby, the bet amount is advanced through a predetermined range and after reaching a maximum bet amount, selecting the "bet one" indicator 42 or button 56 loops the bet amount back to a minimum bet amount. Also, the player may use a "max bet" indicator 44 or button 58 to place the maximum allowable bet.

Figure 2:
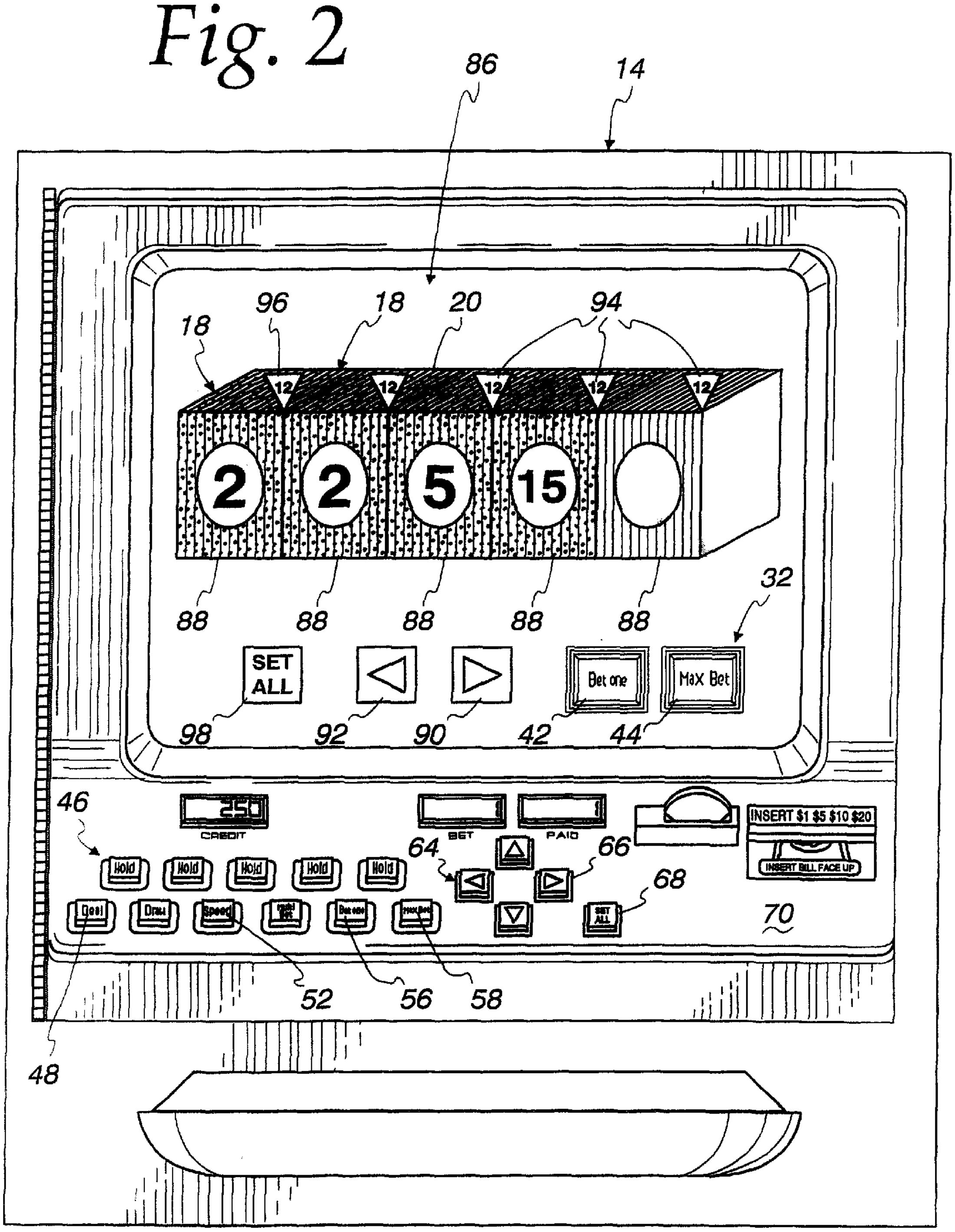
FIG. 2 shows an enlarged view of a "bet mode" display on the screen of the video gaming machine adapted for playing poker.

As an alternative to placing a single bet amount on the whole stack 18, it is also possible to place different bet amounts on individual sections of the stack. In such an embodiment, a "bet mode" of the game is activated by the player by touching the "multi-bet" indicator 40 on the touch screen 12 or the "multi-bet" button 54 on the deck 70. The "bet mode" is adapted for placing bets on sections of game boards 20 in the stack 18 and is accompanied by a "bet-mode" display 86 as shown in FIG. 2.

The "bet-mode" display 86 includes a side-view of the stack 18 containing a number of game boards 20 selected by the player with the stack tab 82. Also, the stack 18 is divided into more than one section 88. Each section 88 includes a predetermined number of game boards 20. To advance from one deck section 88 to another in order to place different bets on each section, a "right-arrow" indicator 90 and a "left-arrow" indicator 92 and corresponding buttons 66, 64 are included on the display 86 and deck 70. A visual indication, such as illumination of a stack section 88, is provided to inform the player which stack section 88 is selected for betting. The player then uses the "max bet" or "bet-one" indicators 44, 42 or buttons 58, 56 to set the desired bet amount on each stack section 88.

In one embodiment, the player selects the number of game boards 20 in each stack section 88 by using indicators 32 or buttons 46 on the deck 70 to increase or decrease the number of game boards 20. Also, the bet-mode display 86 can be provided with a plurality of section tabs 94 located between stack sections 88 as shown in FIG. 2. Touching and dragging a section tab 94 can change the number of game boards in each stack section 88. A number of game boards 20 selected for each stack section 88 appears in a section counter 96 provided in each section tab 94.

To apply a single wager amount to all of the boards in the stack 18 while the game is in "bet mode," a "set all" indicator 98 is included in the "bet-mode" display 86 and a corresponding "set all" button 68 is provided on the deck 70. While in the "bet mode," selecting "set all" places a single wager amount selectable by the player on all of the game boards 20 in the stack 18. The "set all" indicator 98 or button 68 may be selected before or after selecting the bet amount.

The transition from "play mode" to "bet mode" and vice versa can be achieved in many ways. For example, the "bet mode" display 86 may be displayed concurrently with the "play mode" display 16, replace the "play mode" display 16 entirely, overlay the "play mode" display 16, or be animated from the "play mode" display 16 such that the stack 18 shown in the "play mode" display 16 rotates to provide the side-view of the stack 18. The game may commence in either mode.

Referring back to FIG. 1, another feature is the pop-up of individual game boards 20 having winning game outcomes. After the player selects the "deal" indicator 34 or button 48, cards 24 are dealt into each hand of each game board 20 and the microprocessor determines a card game outcome for each game board 20 and determines which game boards 20 carry winning game outcomes or rankings. A winning game board 99 is a game board 20 that holds a winning game outcome. Winning game boards 99 are indicated to the player by having the winning game boards 99 pop-up from the stack 18 in a cash-register-like fashion such that the face 22 of a winning game board 99 is more visible than if the same game board 20 did not have a winning game outcome.

The pop-up of winning game boards 99 can occur simultaneously or can proceed successively from the bottom end 26 towards the top end 28 of the stack 18 or from the top end 28 towards the bottom end 26 of the stack 18. Also, the pop-up of each winning game board 99 can be accompanied by sound such as a ring of a bell or a "chi-ching" of a cash register to enhance player excitement. In the event a plurality of winning game boards 99 occur, multiple sounds will signal the multiple wins. To achieve different effects, the speed with which winning game boards 99 are indicated to the player by color and/or pop-up can be varied by the player using the "speed" button 52 or indicator 38 or pre-set by the casino operator. On the one hand, for example, a slow rate of color change and/or pop-up may instill the player with anticipation for the next winning game board 99. On the other hand, an accelerated rate will provide yet a different visual and acoustical effect for player excitement.

A paytable 100 of the type generally depicted in FIG. 1 for a poker game is provided either on the game machine housing 14 or on the "play mode" display 16 and displays winning game outcomes. The paytable 100 identifies the amount of coins or credits awarded for various outcomes of symbols or number of "hits" that may appear in a game. For example, in a poker game, if the player is not playing against a dealer's hand, which would be displayed if such were the case, the player's winnings will be greater, the higher the poker hand achieved by the player. This is reflected in the paytable 100 shown in FIG. 1. For example, a royal flush pays more than two-of-a-kind. Also, in one embodiment, the winning card game outcomes are color-coded such that each winning game outcome has an associated color as shown on the paytable 100. A game board 20 resulting in a winning game outcome changes to the color corresponding to the winning card ranking as coded on the paytable 100. For example, a royal flush can be indicated in gold letters on the paytable and when a royal flush is achieved in a game board 20, that winning game board 99 will change to a gold color.

After the winning game boards 99 are indicated to the player, the entire face 22 of any winning or losing game board in the stack 18 can be viewed by touching the touch screen 12 at the location of the game board 20. When the game board 20 to be viewed is touched, that game board 20 appears at the top 28 of the stack 18 such that the entire face 22 of the game board 20 is shown. Alternatively, the touched game board 20 may retain its original location in the stack but pop-up such that the entire face 22 of the game board 20 is visible.

Figure 3:
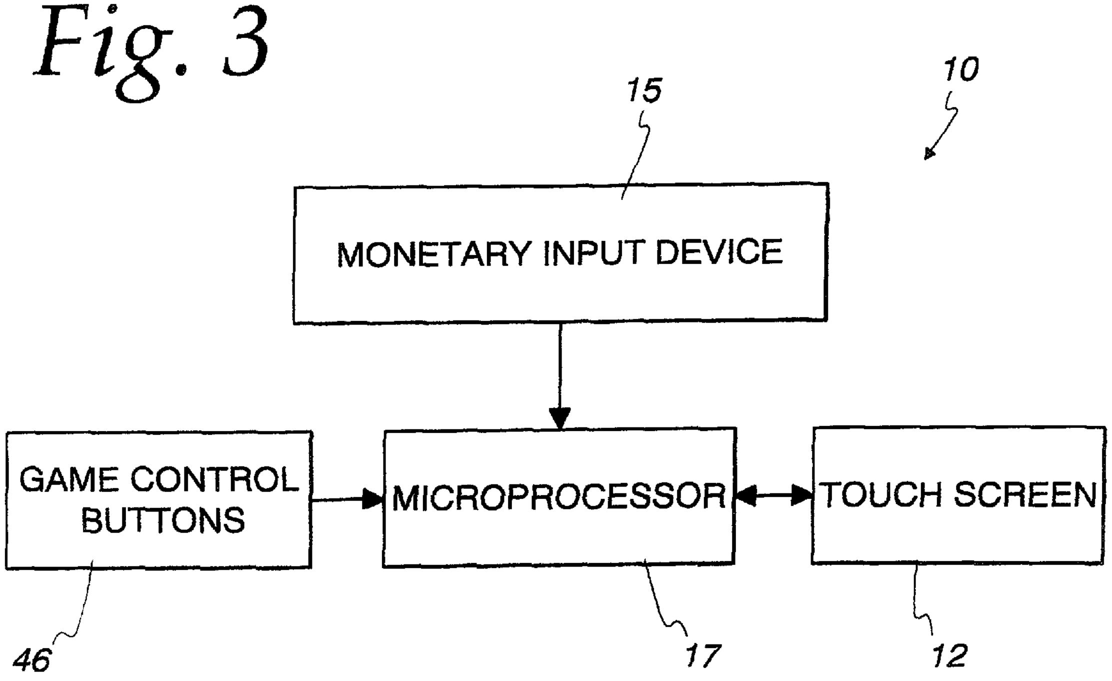
FIG. 3 is a block diagram of the video gaming machine architecture.

FIG. 3 is a block diagram of the gaming machine 10 including a touch screen 12, a monetary input device 15, a microprocessor 17, and game control buttons 46. The particular game architecture shown is a generic architecture using components typical to game apparatuses suitable for use with the present invention. The microprocessor 17 implements the functions of the gaming machine 10 and includes several input and output functions. The microprocessor 17 includes a digital microprocessor or similar controller device and other electronic components such as display drivers and graphics chips necessary for implementing and controlling the gaming machine 10. Various input devices such as the touch screen 12, the monetary input device 15, and game control buttons 46 are used by a player to provide input to the gaming machine to influence game events and to achieve predetermined goals. The touch screen 12 provides input functions via machine control buttons or indicators 32, for example, as well as output functions such as providing visual feedback such as images to the player during the game. Other visual output devices include the credit window 76, bet window 78, paid window 80, and various light sources. Auditory output such as sound effects or speech may be provided by other game output devices such as speakers and alarms.

Figure 4:
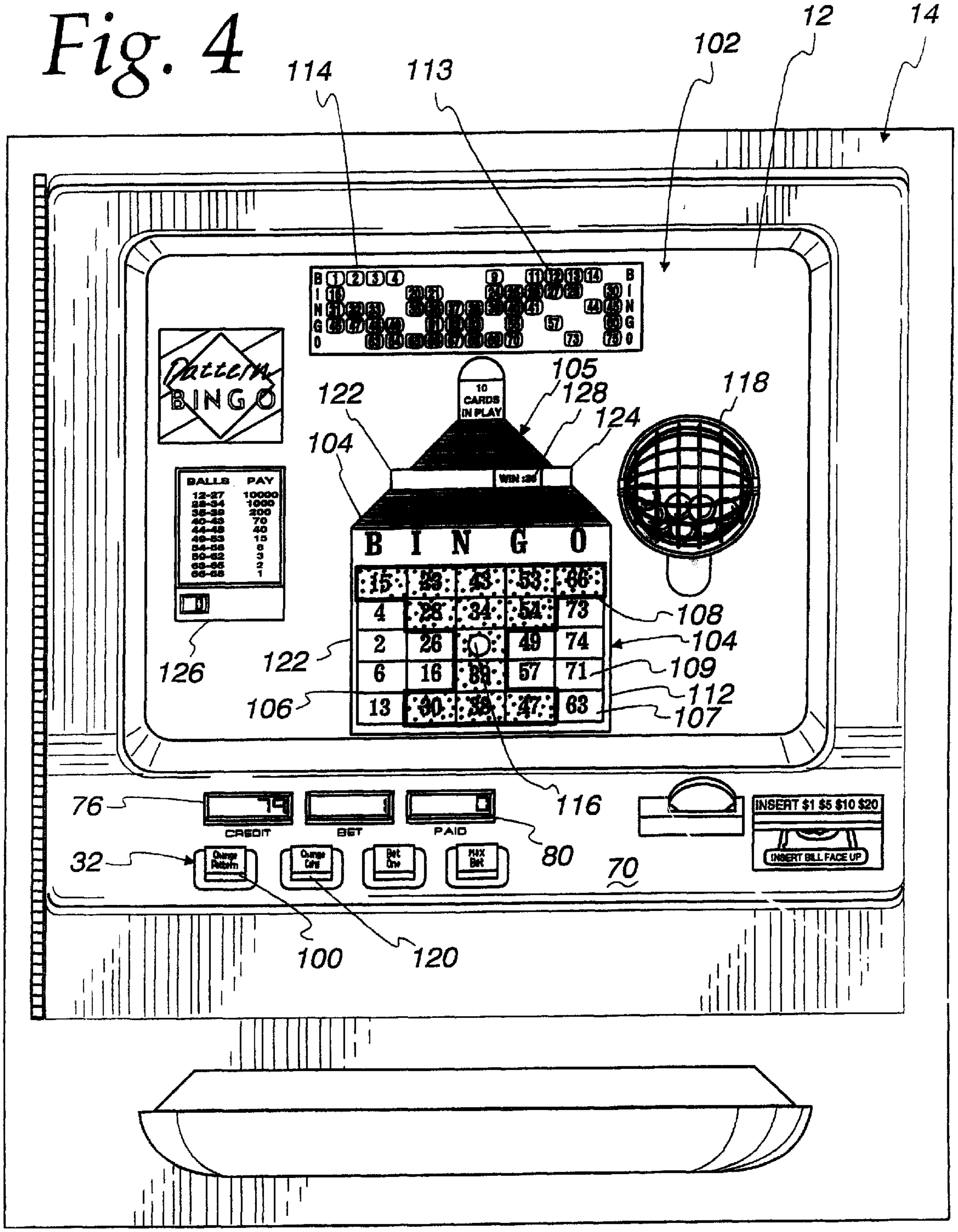
FIG. 4 shows a video gaming machine adapted for playing bingo.

While the invention is described with respect to a simulated poker game, the invention can be applied to other games as well. For example, a video version of bingo according to the invention is shown in FIG. 4. A bingo game display 102 includes a depiction of multiple bingo game boards 104 arranged in a stack 105 as described above and like numerals are used to identify like features. In the bingo version, the face 106 of each game board 104 resembles a traditional bingo board and includes a five-by-five array 107 of preselected numbers 109; however, the shape or size of the array 107 which the present invention may take is not intended to be limited to such. All of the preselected numbers 109 in each array 107 are randomly selected for each individual bingo game board 104 or, alternatively, a portion of the preselected numbers 109 in the array 107 are the same for all of the bingo game boards 104. Duplicating a portion of the preselected numbers 109 into all of the bingo game boards 104 in the stack 105 is one way of interlinking the game boards 104.

As in traditional bingo, in one embodiment, the object of the game is to have randomly called numbers coincide with preselected numbers on any of player's game boards so as to fill the entire board or to form a specified shape or pattern 108. The specified shape or pattern 108 may be an "X" "T", "L", a diagonal line, a horizontal line, a vertical line and so on. The pattern 108 is selected by touching a "change pattern" indicator on the touch screen (not shown) or a "change pattern" button 110 on the deck 70. Once selected, the pattern 108 is duplicated onto all of the bingo game boards 104 in the stack 105 and is shown on a topmost game board 112 whose board face 122 is entirely visible. Alternatively, a different pattern 108 is selected for each bingo game board 104 either by the player or randomly by the machine 10 such that more than one pattern 108 is found in the stack 105. Further yet, in another embodiment, any specified winning pattern 108 can be achieved on any bingo game board 104. For example, for bingo game boards 104 having a five-by-five array 107, a winning pattern 108 may include any row of five numbers. In such a version, multiple winning patterns on a single bingo game board 104 are possible. In one embodiment, a preselected number of random numbers is drawn and then the number of winning patterns in the stack 105 determined. The preselected number of random numbers can include all of the possible random numbers. When the number of winning patterns in the stack 105 is determined, the payout amount is resolved in accordance with a paytable, for example, as described below.

In one embodiment, a "bet mode" display as described above and shown in FIG. 2 is adapted to the bingo version for placing different bet amounts on individual stack sections. As described above, the "bet mode" display includes a side-view of the stack containing a number of bingo game boards 104.

Random numbers are drawn from a field 113 of numbers that are displayed in a number table 114. Those random numbers that coincide with the pre-selected numbers 109 on a game board 104 are automatically marked in some fashion such as with a red dot 116. The number table 114 displays the numbers that have not been called. The video screen 12 also displays an animated tumbler 118 for increased player enjoyment. The random numbers are applied to all of the bingo game boards 104 in the stack 105 or, alternatively, different random numbers are chosen by the microprocessor for each bingo game board 104 and a corresponding number table 114 is provided for each.

The player may choose to view any game board 104 in the stack 105 by touching the video touch screen 12 of the game board 104 or by pressing a "change card" button 120 on the deck 70 and the player can see how many squares have yet to be filled to complete a pattern 108 and thereby achieve a winning game outcome. A winning game board 124 is indicated to the player by changing the color of the card and/or with the pop-up feature such that a winning game board 124 pops-up from the stack 105 such that the face 122 of the winning game board 124 is more visible than if the same game board 124 was a non-winning game board 104. Also, the pop-up of each winning game board 124 can be accompanied by sound such as a voice yelling "bingo" to enhance player excitement.

After the winning game board 124 is indicated to the player, the entire face 122 of any winning or losing game board 104 in the stack 105 can be viewed by touching the touch screen 12 at a location of the game board 104 to be viewed. A paytable 126 displayed on the touch screen 12 or housing 14 shows the amount won on any winning game board 124. Generally, the paytable 126 is graduated such that the payout amount is greater if a pattern is completed with fewer drawings of random numbers than if most of the random numbers have been called at the time of winning. In one embodiment, a window 128 is provided on a winning game board 124 to indicate the number of random numbers drawn for that winning game board 104, or for example, the name of the winning card hand in the poker version. The appropriate payout amount is included in the "paid" window 80 and added to the "credit" window 76 and, in one embodiment, the payout amount is indicated on the window 128.

Figure 5:
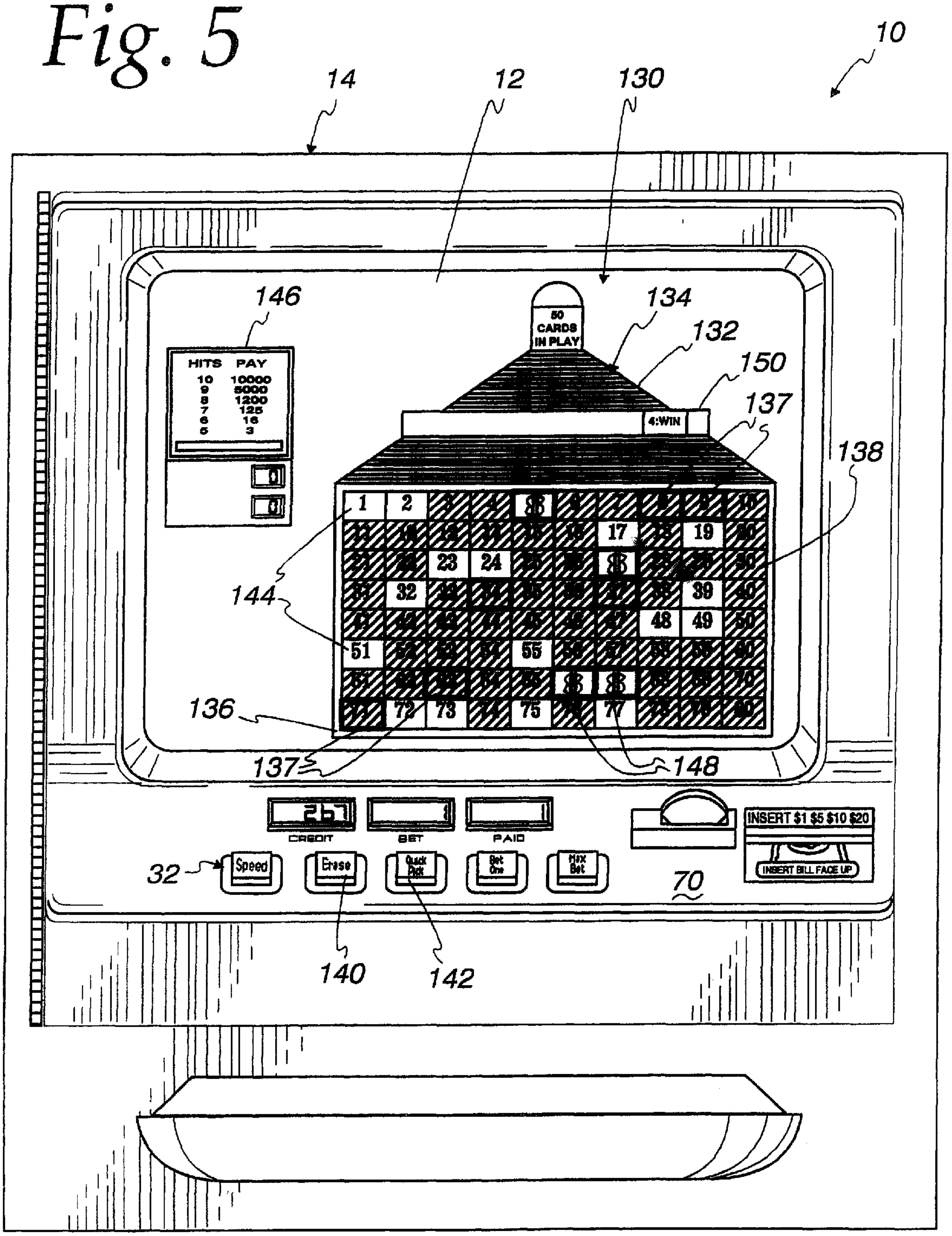
FIG. 5 shows a video gaming machine adapted for playing keno.

Another adaptation of the present invention is a video version of keno shown in FIG. 5 which is adapted for playing multiple keno games substantially at the same time. A display 130 includes a depiction of multiple keno game boards 132 arranged in a stack 134 in the same fashion described above. In the keno version of this invention, each game board 132 includes a face 136 with a field 138 of numbers generally in a ten-by-eight array of squares with numbers ranging from one to eighty displayed in each square; however, the shape and size of the field 138 which the present invention may take is not intended to be limited to such.

As in traditional keno, the player picks ten or less lucky numbers 137 by touching the screen 12 at the location of each desired number on the field 138. Touching a lucky number 137 again or pressing an "erase" button 140 will erase a selection. Alternatively, the player may have the gaming machine 10 randomly select the ten numbers by pressing a "quick pick" button 142 on the deck 70. For example, to interlink the keno game boards 132 in the stack 134, the lucky numbers 137 are applied to the entire stack and are therefore the same in all of the keno game boards 132 in the stack 134. The lucky numbers 137 are marked in some fashion such as with illumination, a change in color, or a highlighted square border. As shown in FIG. 5, for example, the lucky numbers 137 are 5, 6, 9, 27, 34, 37, 63, 66, 67, and 71. The gaming machine's microprocessor 17 then randomly chooses twenty winning numbers 144 from the field 138 of numbers, generally one through eighty, for each game board 132 and displays those winning numbers 144 on the face 136 of each keno game board 132 in some fashion such as with illumination. In FIG. 5, the winning numbers 144 are shown to be 1, 2, 5, 17, 19, 23, 24, 27, 32, 39, 48, 49, 51, 55, 66, 67, 72, 73, 75, and 77. A different set of winning numbers 144 is generated for each keno game board 132 in the stack 134 or alternatively the same random numbers are applied to the whole stack 134. In another embodiment, a portion of the randomly chosen winning numbers 144 are applied to all keno game boards 132 in the stack 134 and the remainder of the winning numbers 144 are randomly chosen for each individual game board 132. For example, out of twenty winning numbers 144, ten winning numbers 144 are applied to all of the keno game boards 132 and, therefore, are identical for each keno game board 132. The remaining ten winning numbers 144 are randomly chosen for each individual keno game board 132. The player wins based on the number of matching numbers 148. Matching numbers 148 are winning numbers 144 that correspond to the lucky numbers 137. The matching numbers 148, as shown in FIG. 5, for example, are 5, 27, 66, and 67. A paytable 146 reflects the payout amount accordingly. Matching numbers 148 or hits are indicated to the player in some fashion such as with a dollar sign.

During play or after winning, the player may choose to view any keno game board 132 in the stack 134 by touching the touch screen 12 at the location of the game 132. A winning keno game board 150 is indicated to the player with the pop-up feature described above and may be accompanied by sound as well. Furthermore, in another embodiment, a "bet mode" display as shown in FIG. 2 and described above is adapted to the keno version for placing different bet amounts on individual stack sections. As described above, the "bet mode" display includes a side-view of the stack containing a number of keno game boards 132.

Figure 6:
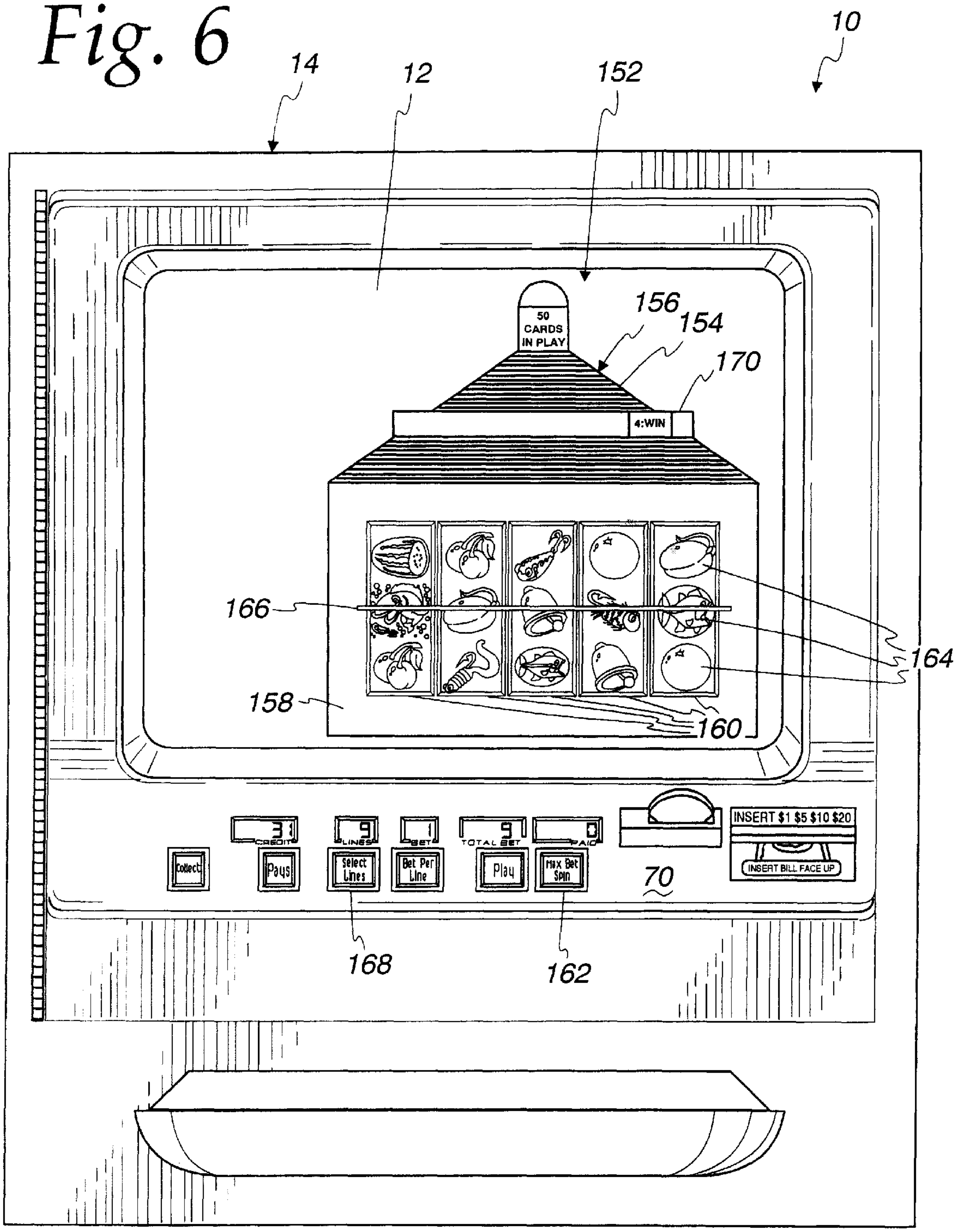
FIG. 6 shows a video gaming machine adapted for playing a reel-type slot game.

Another adaptation of the video gaming machine 10 is a video version of a reel slot machine shown in FIG. 6 which is adapted for playing multiple reel slot games substantially at the same time. A display 152 includes a depiction of multiple reel game boards 154 arranged in a stack 156 in the same fashion described above. In a reel slot game version of this invention, each reel game board 154 includes a face 158 with reels 160. While five reels 160 are shown in FIG. 6, the invention is not limited to any particular number of reels 160.

The reels 160 are set in motion by either pulling a lever (not shown) or depressing a push button 162 on the gaming machine 10. The microprocessor then operates according to its game program to select a game outcome corresponding to a particular set of reel stop positions and, using technology well known in the art, causes each of the reels 160 to stop at the preselected stop position. Symbols 164 are affixed to the reels 160 to graphically illustrate the reel stop position and indicate whether the stop position of the reels represent a winning game outcome along a pay line 166. While one pay line 166 is illustrated, a number of pay lines may be activated corresponding to the number of coins or credits played. The player selects pay lines by pressing a "select lines" button 168.

Winning game outcomes are identifiable by a pay table (not shown) affixed to the gaming machine 10 or shown on the display 152. A winning combination occurs when the symbols 164 appearing on the reels 160 correspond to one of the winning combinations on the pay table. Different methods for interlinking the reel game boards 154 are discussed below.

In one embodiment, a "bet mode" display as described above and shown in FIG. 2 is adapted to the reel slot version for placing different bet amounts or selecting different or multiple pay lines on individual stack sections. As described above, the "bet mode" display includes a side-view of the stack containing a number of reel game boards 154.

During play or after winning, the player may choose to view any reel game board 154 in the stack 156 by touching the touch screen 12 at the location of the board 154. A winning game board 170 is indicated to the player with the pop-up feature described above and may be accompanied by sound and illumination.

The invention may be employed in either a "basic" game, a "secondary" or "bonus" game or employed in both a "basic" and "bonus" game. The "bonus" game has been successfully employed to enhance the entertainment value of the game and is generally entered upon the occurrence of a selected event or outcome of the "basic" game.

Figure 7:
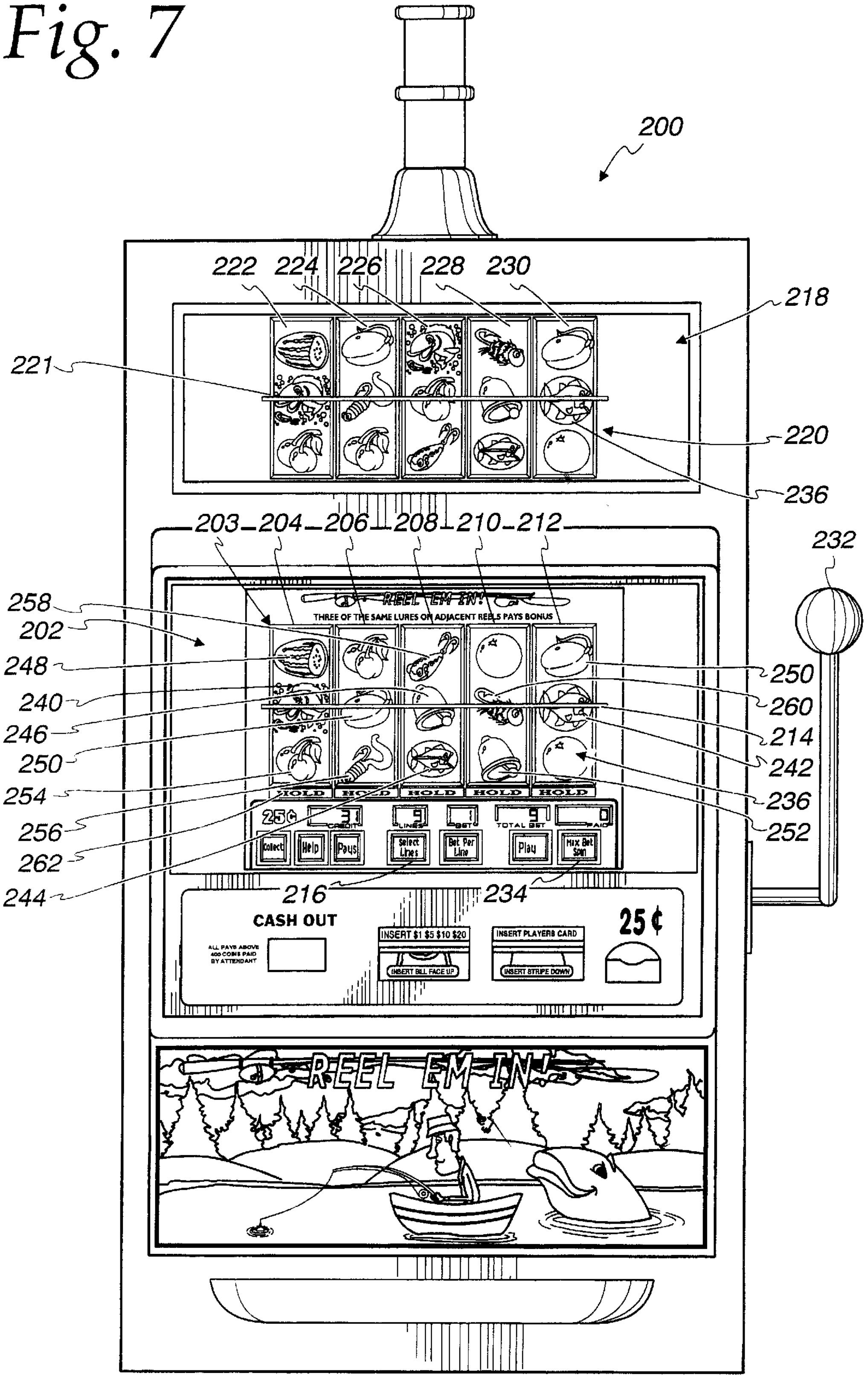
FIG. 7 shows another embodiment of a video gaming machine adapted for playing a reel-type slot game having two reel sets.

Referring now to FIG. 7, there is depicted another embodiment of the present invention. A reel-type slot machine 200 includes a first visual display 202 showing images of a first set of elements or a first set of rotatable reels 203. The first set of reels 203 has a first reel 204, a second reel 206, a third reel 208, a fourth reel 210 and a fifth reel 212. Game play is initiated by inserting a number of coins or playing a number of credits causing the microprocessor to activate a pay line 214. While FIG. 7 depicts a single activated pay line 214, any pay line or multiple pay lines may be activated depending on the number of coins or credits played and by pressing the "select lines" button 216. It will be appreciated that the present invention may be implemented on machines having fewer or greater number of pay lines and/or pay line(s) which are activated independently of the number of coins or credits played. The present invention may also be implemented with mechanical "reels." Accordingly, the terms "reels," "spinning reels," etc., and the like shall be understood herein to encompass video, as well as mechanical implementations.

The reel-type slot machine 200 includes a second visual display 218 showing a second set of elements or rotatable reels 220 having a pay line 221. The second set of reels 220 has a first reel 222, a second reel 224, a third reel 226, a fourth reel 228, and a fifth reel 230. While the number of reels in the second set of reels 220 is preferably the same as in the first set of reels 203, the invention is not so limited and the second set of reels 220 may contain a lesser or greater number of reels than the first set of reels 203.

The reels 204, 206, 208, 210, 212 of the first set of reels 203 are set in motion by either pulling a lever 232 or depressing a button 234 on the slot machine 200. The reels 222, 224, 226, 228, 230 of the second set of reels 220 are set in motion at the same time. The microprocessor then operates according to its game program to select a game outcome for the first set of reels 203 corresponding to a particular set of reel stop positions along a pay line 214 and, using technology well known in the art, causes each of the reels 204, 206, 208, 210, 212 to stop at the preselected stop position. Symbols 236 are affixed to all of the reels 204, 206, 208, 210, 212, 222, 224, 226, 228, 230 to graphically illustrate the reel stop position and indicate whether the stop position of the reels represent a winning game outcome. Winning game combinations (e.g. symbol combinations resulting in the payment of coins or credits) are identifiable by a pay table 238 (see FIG. 8) affixed to the slot machine 200. A winning combination occurs when the symbols 236 appearing on the reels 204, 206, 208, 210, 212 along the pay line 214 correspond to one of the winning combinations on the pay table 238.

An example of a pay table 238 is shown in FIG. 8. The "WIN COMB" or "WINNING COMBINATION" column identifies various winning basic game outcomes that may occur. For example, the winning combination of FG FG———corresponds to the appearance of two gigantic fish symbols 240 (see FIG. 7) on the pay line 214 on any of the reels. The "PAY" column lists the pay values of the respective winning combinations for a one credit game. As shown in FIG. 7, symbols include a gigantic fish (FG) 240, a big fish (FB) 242, a small fish (FS) 244, a bell (BL) 246, a melon (ML) 248, a plum (PL) 250, an orange (OR) 252, a cherry (CH) 254, a worm (WM) lure 256, a fish lure 258, a fly lure 260.

After the microprocessor selects a game outcome for the first set of reels 203, using technology well known in the art, and causes each of the reels 204, 206, 208, 210, 212 to stop at the preselected stop position, it is determined whether a winning combination has been achieved in the first set of reels 203. If a winning combination is achieved, i.e., symbol combinations result in the payment of coins or credits as identified in a pay table 238, the microprocessor will cause the symbols of the winning combination to be automatically applied or carried over to the pay line 221 of the second set of reels 220 stopping only the reels of the second reel set 220 necessary to duplicate or carry over the symbols of the winning combination to the pay line 221.

In the event the resulting winning combination comprises less than five symbols, the remaining reel(s) in the second reel set 220 that have not been used to duplicate the winning combination of the first set of reels 203 are then stopped and their outcomes determined. Hence, the player is given an opportunity, in the second set of reels 220, to improve upon the winning combination of the first set of reels 203.

If no winning combination results from the first set of reels 203, i.e., none of the reels 204, 206, 208, 210, 212 form a winning combination as shown on the pay table 238, then all of the reels 222, 224, 226, 228, 230 of the second set of reels 220 are stopped to form a game outcome selected by the microprocessor. Hence, the player is given another chance, in the second set of reels 220, to achieve a winning combination. In the event a winning combination comprises five symbols, the winning combination in its entirety is duplicated into the pay line 221 of the second set of reels 220 and, hence, the player receives a double payout.

For example, if the first set of reels 203 are stopped such that the game outcome is determined by the symbols FG PL BL fly lure FB, then the winning combinations corresponding to FG————and FB————on the pay table 238 have been achieved. This game outcome is depicted in FIG. 7. According to the pay table 238 of FIG. 8, the winning outcome of FG————has a pay value of 2 and the winning outcome FB————has a pay value of 2 for a combined pay value of 4. This winning combination, FG FB————, is then carried over to the pay line 221 of the second set of reels 220. This can be accomplished in several ways. For example, the first reel 222 and the second reel 224 are stopped such that the FG and FB symbols appear along the pay line 214 and the third through fifth reels 226, 228, 230 continue spinning until stopped on symbols determined by the microprocessor independent of the symbol outcomes for the first set of reels 203. In another embodiment, the FG and FB symbols may be applied along the pay line 221 to the same corresponding locations as on the first set of reels 203 ie., on the first reel 222 and the fifth reel 230. The second reel 224, third reel 226 and fourth reel 228 continue spinning until stopped on symbols determined by the microprocessor independent of the symbol outcomes for the first set of reels 203. FIG. 7 shows the winning combination, FG FB———, applied along the pay line 221 of the second set of reels 220 as FG———FB. The symbol outcomes for the reels 224, 226 and 228 are independent of the symbol outcomes for the first set of reels 203.

In another example, if the first set of reels 203 are stopped such that the game outcome is determined by the symbols FG BL ML FG OR, then a winning combination, corresponding to FG FG———on the pay table 238, has been achieved. According to the pay table 238, this winning combination has a pay value of 20. This winning combination, FG FG———, is then automatically carried over to the pay line 221 of the second set of reels 220. This can be accomplished in several ways as described above. For example, the two FG symbols may be applied to the second set of reels 220 to the same corresponding locations as in the first set of reels 203 i.e., on the first reel 222 and the fourth reel 228. The second reel 224, third reel 226 and fifth reel 230 continue spinning until stopped on symbols determined by the microprocessor independent of the symbol outcomes of the first set of reels 203. For instance, the second reel 224 may be stopped on a FG symbol, the third reel 226 on a BL symbol and the fifth reel 230 on a FG symbol. The winning combination, therefore, on the second set of reels 220, would correspond to FG FG FG FG—on the pay table 238 which has a pay value of 800. The slot machine 200 can be designed to distribute to the player the payout amount of 800 for a one-credit game or the sum of the first reel set 203 and second reel set 220 which would be 20 from the first set of reels 203 and 800 from the second set of reels 220 for a total payout amount of 820.

In another example, if the first set of reels 203 are stopped such that the game outcome is determined by the symbols BL BL ML OR ML, then no winning combination corresponding to the pay table 238 has been achieved. None of the symbols from the pay line 214 of the first set of reels 203 is carried over to the second set of reels 220 and all of the reels 222, 224, 226, 228, 230 of the second set of reels 220 are spun until stopped on symbols determined by the microprocessor. As a result, the player receives a second chance to achieve a winning combination.

In yet another example, if the first set of reels 203 are stopped such that the game outcome is determined by the symbols FB FB FB FB FB, then a winning combination corresponding to a payout value of 1000 has been achieved. This winning combination, FB FB FB FB FB, is then automatically carried over to the second set of reels 220 and the player receives a total payout amount of 2000.

The invention is not limited to automatically carrying over or duplicating winning combinations from the first set of reels 203 to the second reel set 220, but in one embodiment, symbols are carried over to the second reel set 220 according to a predetermined game program. For example, the game program can be designed to carry over any predetermined outcome. For example, a game outcome of ML ML———may be carried over in anticipation of forming the winning combination ML ML ML——— having a pay value of 20. Another example would be to carry over a wild symbol or bonus symbol that would afford the player a desirable advantage.

In one embodiment, the reels 204, 206, 208, 210, 212 of the first reel set 203 are not stopped simultaneously. Instead, to increase player excitement, the reels 204, 206, 208, 210, 212 are stopped one-at-a-time. The stopping of reels 204, 206, 208, 210, 212 proceeds randomly or in any direction such as from left to right. Furthermore, sound, illumination or change in color can accompany the stopping of a reel that results in a winning combination. Also, the symbol of a winning combination can be immediately carried over to the second set of reels 220.

For example, with all the reels 204, 206, 208, 210, 212 spinning, the first reel 204 is stopped first-in-time at an FS symbol. Because a single FS constitutes a winning combination according to the pay table 238, it is carried over to the second reel set 220 such that the first reel 222 displays the FS symbol. The outcome of the second reel 206 of the first set of reels 203 is determined to be ML. Because a single ML is not a winning combination, it is not applied to the second reel set 220. The second reel 206 of the first reel set 203 remains stopped at the ML symbol while the second reel 224 of the second set of reels 220 remains blank, stationary or continues to spin if initially so activated. Then, the third reel 208 stops at another FS symbol. Because two FS symbols constitute a winning combination, the FS is carried over to the second set of reels 220. The FS symbol can be carried over to either of two locations. First, the second reel 224 can be made to display the FS symbol, or alternatively, the FS symbol is displayed on the third reel 226 which is the location on the second reel set 220 which corresponds to the symbol's appearance on the first reel set 203. If the FS symbol is carried over to the second reel 224, the remaining reels 226, 228, 230 continue spinning. If the FS symbol is carried over by the alternate method, the third reel 226 displays the FS symbol and the second, fourth and fifth reels 224, 228, 230 remain stationary, blank or continue spinning if initially so activated. Next, the fourth reel 210 is stopped at a ML symbol, for example, which is not carried over. The fifth reel 212 is stopped at a PL symbol, which is also not carried over. All of the reels of the first reel set 203 display the outcome of FS ML FS ML PL while the second set of reels 220 display FS FS———, or alternatively FS—FS——with three reels remaining stationary, blank or still spinning if initially so activated. The microprocessor then proceeds to determine the outcome of the remaining three reels giving the player a chance to improve upon an already winning combination.

As shown above, the symbols that are carried over from the first set of reels 203 are automatically determined by the microprocessor in accordance with winning outcomes shown in a pay table 238. In another embodiment, the decision to carry over certain symbols is performed manually by the player by pressing a hold button 262 (see FIG. 7) to hold a certain symbol. The hold button 262 can be pressed for symbols as they are stopped one at a time, or the hold button 262 can be pressed for symbols to be carried over after all the reels of the first reel set 203 have all stopped spinning. An additional button (not shown), such as a "don't hold" button, may be required to inform the processor of the player's decision.

As mentioned earlier, the first reel set 203 and second reel set 220 may be video or mechanical implementations. In a video simulation of reels, the reels can be blurred to simulate the effect of spinning. While the second set of reels 220 may also be spinning, the invention is not limited to such and the second set of reels 220 may initially be stationary or blank and then illuminated with symbols as they are determined.

Figure 9:
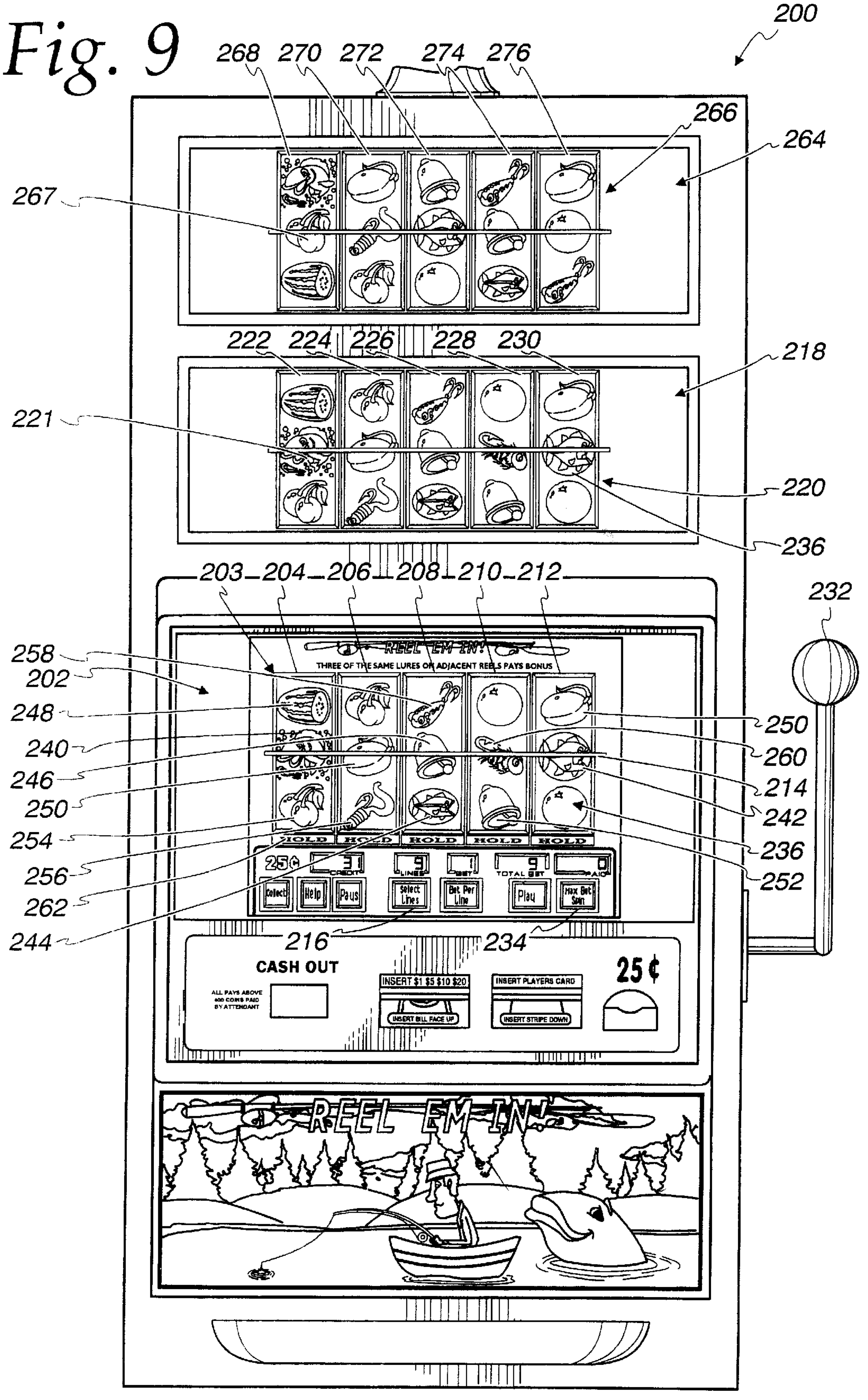
FIG. 9 shows another embodiment of a video gaming machine adapted for playing a reel-type slot game having three reel sets.

Referring now to FIG. 9, there is shown yet another embodiment of the invention where at least two sets of reels are employed. In addition to first and second visual displays 202, 218, the reel-type slot machine 200 includes a third visual display 264 showing images of a third set of rotatable reels 266 having a pay line 267. The third set of reels 266 has a first reel 268, a second reel 270, a third reel 272, a fourth reel 274, and a fifth reel 276. While the number of reels in the third set of reels 220 is preferably the same as in the first reel set 203 and second reel set 220, the invention is not so limited and the third set of reels 266 may contain a lesser or greater number of reels than found in either the first reel set 203 or second reel set 220. The invention is also not limited to the number of displays or sets of reels that can be employed.

Game play is initiated by inserting a number of coins or playing a number of credits which causes the microprocessor to activate a number of pay lines corresponding to the number of coins or credits played. For example, one coin or credit will activate one pay line and the player can buy additional pay lines by inserting a corresponding number of coins or credits. Alternatively, a certain number of coins or credits will entitle the player to a predetermined number of pay lines.

In one embodiment, the second reel set 220 and third reel set 266 are linked such that symbols of the first reel set 203 are carried over to the pay line 221 of the second reel set 220 in the same fashion as described above and then carried over from the pay line 221 of the second reel set 220 to the pay line 267 of the third reel set 266 also in the same fashion as described above. For example, if a winning combination of less than five symbols (e.g. ML ML ML——) is achieved on the first reel set 203 of reels, it is automatically applied to the pay line 221 of the second set of reels 220. Those reels that are not used to duplicate the symbols of the winning combination remain blank, stationary or continue spinning, if initially so activated, until the microprocessor determines their outcomes. Continuing with the example, the fourth reel 228 and fifth reel 230 of the second reel set 220 are then determined. If the outcome of the second reel set 220 results in ML ML ML ML PL, for example, the ML symbol of the fourth reel 228 is carried over to the pay line 267 of the third reel set 266 such that the outcome of the third reel set 266 is ML ML ML ML—. Then, the fifth reel 276 of the third reel set 266 is determined independent of the symbol outcome and for the first reel set 203 and second reel set 220. As a result, the player has two opportunities to improve upon the winning combination of the first reel set 203 in addition to receiving at least a triple payout on a winning combination achieved in the first reel set 203 if one is achieved therein.

In another embodiment, any undetermined reels of the third reel set 266 are independently determined of the second reel set 220. For example, if a winning combination of less than five symbols (e.g. ML ML ML——) is achieved on the first set of reels 203, it is applied to the second reel set 220 and third reel set 266 and the outcome of the fourth and fifth reels 228, 230 of the second reel set 220 are determined independently from the fourth and fifth reels 274, 276 of the third reel set 266. If the winning combination ML ML ML——is achieved in the first reel set 203, illustrative outcomes for the second reel set 220 and third reel set 266 are ML ML ML ML PL and ML ML ML BL CH, for example.

In another example, if no winning combination occurs on the first set of reels 203, then there is no duplication of symbols along the pay lines 221, 267 of the second reel set 220 and third reel set 266. The outcome of the reels of the second reel set 220 and third reel set 266 is determined independently from each other. Alternatively, the outcome of the second set of reels 220 is determined such that winning combinations resulting therein are duplicated into the pay line 267 of the third set of reels 266. The player, as a result, has an opportunity to improve upon the winning combination of the second reel 220 in addition to receiving at least a double payout on the winning combination of the second reel set 220.

In yet another example, if the outcome of the first set of five reels 203 is a winning combination comprising five symbols, then the winning combination is duplicated into both the pay lines 221, 267 of the second reel set 220 and third reel set 266. As a result, the player receives a payout three times the amount of the winning combination. While the above examples refer to the duplication of winning combination(s), any predetermined symbol or combination of symbols not appearing as winning combinations on the pay table 238 can be duplicated into sets 220, 266.

Figure 10:
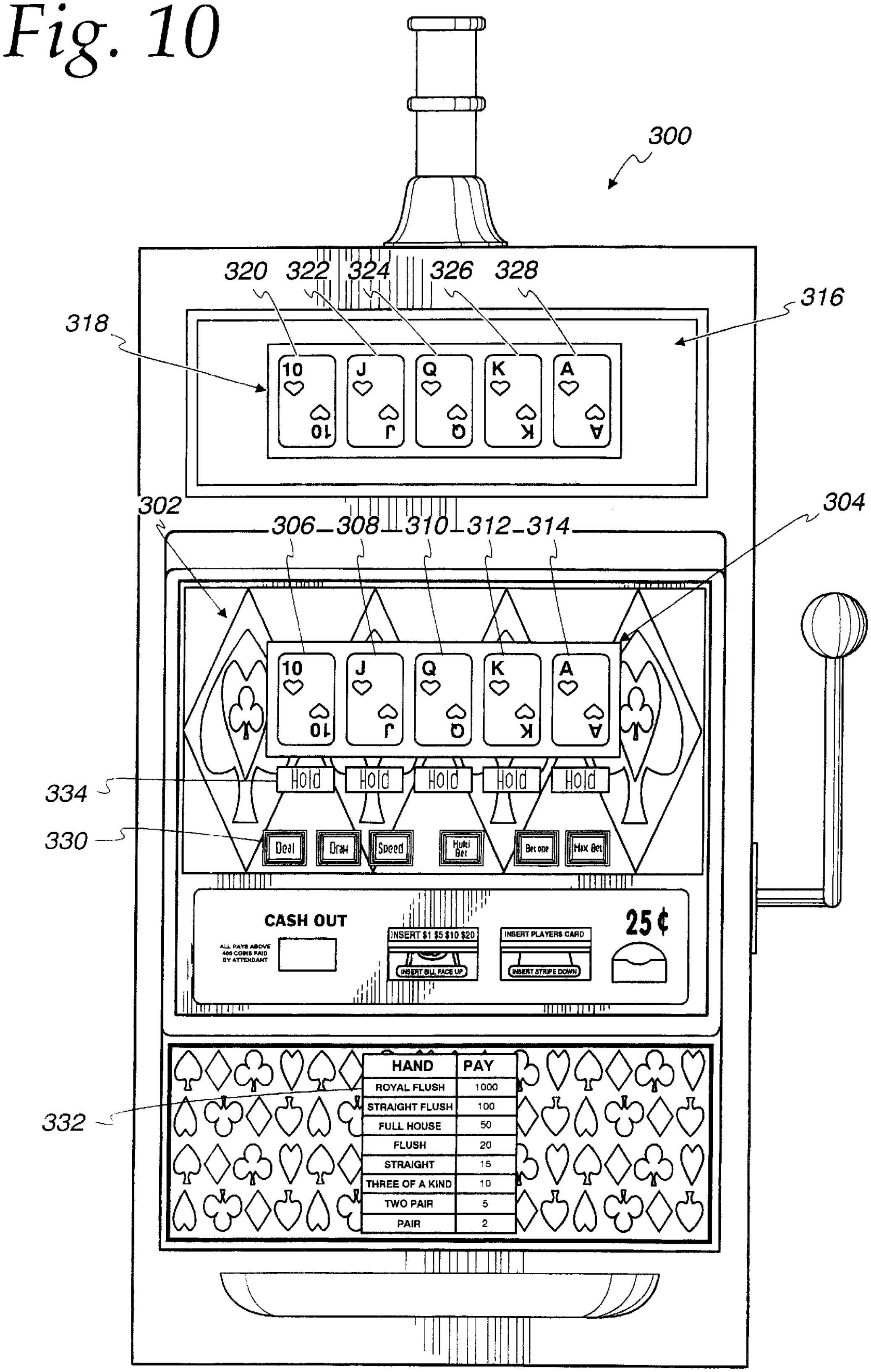
FIG. 10 shows a video gaming machine adapted for playing a card game having two hands.

While the invention is described with respect to a reel-type slot machine, the invention can be applied to other games as well depicting other sets of game elements. For example, a video version of a poker game according to the invention described in FIGS. 7–9 is shown in FIG. 10. The gaming machine 300 includes a first display 302. The first display 302 includes a depiction of a first set of game elements or first hand of cards 304 comprising a first card 306, a second card 308, a third card 310, a fourth card 312 and a fifth card 314. While a five-card hand is depicted, the invention is not so limited.

The gaming machine 300 also includes a second display 316. The second display 316 includes a depiction of a second set of game elements or a second hand of cards 318 including a first card 320, a second card 322, a third card 324, a fourth card 326 and a fifth card 328. While the number of cards comprising the second hand 318 is preferably the same as in the first hand 304, the invention is not so limited and the second hand 318 may contain a lesser or greater number of cards than the first hand 304.

Game play is initiated by inserting a number of coins or playing a number of credits. By pressing the deal button 330, the microprocessor operates according to its game program to select cards 306, 308, 310, 312, 314 to be dealt into the first hand 304 and to determine a card game outcome for the first hand 304. Winning combinations (e.g. card combinations resulting in the payment of coins or credits) are identified by a pay table 332 affixed to the gaming machine 300. A winning combination occurs when the cards 306, 308, 310, 312, 314 correspond to one of the winning combinations listed on the pay table 332. The pay table 332 also includes the pay values of the respective winning combinations for a one-credit game.

After the microprocessor selects a game outcome for the first hand 304 using technology well known in the art, it is determined whether a winning combination has been achieved in the first hand 304. If a winning combination is achieved, the cards of the winning combination are duplicated or carried over from the first hand 304 to the second hand 318. The invention is not limited to duplicating only the winning combinations. Any predetermined outcome, combination of cards, or single cards such as a "wild" card may also be duplicated into the second hand 318.

In the event that the number of cards that are carried over or duplicated into the second hand 318 comprise fewer than the total number of cards required to complete a hand, such as in the case of a pair or three-of-a-kind, additional cards are dealt into the second hand 318 to complete the hand 318. Hence, the player is given an opportunity in the second hand 318 to improve upon the carried over cards in addition to at least doubling the winnings attributable to a winning combination of the first hand 304 if one is achieved. If no cards are duplicated into the second hand 318, then five cards are dealt into the second hand 318 and the player is afforded another chance to achieve a winning combination. In the event a winning combination comprising five cards is achieved, such as a royal flush, all of the cards of the winning combination are duplicated into the second hand 318 and no additional cards are dealt into the second hand 318 because the hand is already complete with the five carried over cards. In this case, the player receives a payout twice the pay value of the winning combination of the first hand 304. These possible scenarios are now illustrated by example.

For example, if the cards that are dealt into the first hand 304 result in a four-of spades as the first card 306, a king-of-clubs as the second card 308, a four-of-hearts as the third card 310, a nine-of-diamonds as the fourth card 312 and a four-of-diamonds as the fifth card 314, then a three-of-a-kind has been achieved. The cards 306, 310, 314 comprising the three-of-a-kind are carried over to the second hand 318 and two additional cards are dealt into the second hand 318. The three-of-a-kind may be duplicated into the second hand 318 as cards 320, 322, 324 or, alternatively, in their corresponding locations as cards 320, 324, 328. If the two additional cards that are dealt into the second hand 318 improve the three-of-a-kind to create a full house, for example, then the player receives a combined payout amount. The combined payout amount is the sum of the pay value of the first hand 304 and the pay value of the second hand 318. In this case, the combined payout amount would be 60 (10+50) according to the pay table 332. Alternatively, the player receives only the higher of the two pay values which in this case would be 50 for the full house.

In one embodiment, predetermined single cards or combinations of cards other than those forming winning combinations according to the pay table 332 are carried over. For example, in the event a game outcome of the first hand 304 does not form a winning combination according to the pay table 332, predetermined outcomes are carried over to the second hand 318. For example, if the first hand 304 comprises a three-of-clubs, a nine-of-spades, a ten-of-diamonds, a five-of-hearts and a jack-of-diamonds, the ten-of-diamonds and the jack-of-diamonds may be predetermined to be carried over to the second hand 318 because both cards are capable of forming a royal flush. Other cards such as a joker or other "wild" card or combinations of cards that come close to forming certain winning combinations as determined by the microprocessor are also caused to be carried over to the second hand 318.

In another example, the first hand 304 is dealt a three-of-hearts, a queen-of-spades, a ten-of-diamonds, a five-of-clubs and an eight-of-hearts. This hand does not result in a winning combination according to the pay table 332 and if determined by the microprocessor that the cards are not predetermined to be carried over, then no cards will be duplicated into the second hand 318. As a result, five new cards are dealt into the second hand 318 and their outcome determined. As a result, the player receives a second chance to achieve a winning combination.

Also, in the event that a winning combination is achieved such that all five cards 306, 308, 310, 312, 314 of the first hand 304 comprise a winning combination, then all five cards are duplicated into the second hand 318. Examples of winning combinations comprising five cards according to the pay table 332 include a royal flush, straight flush, full house, flush and a straight. The player, as a result of achieving one of these outcomes, collects at least double the pay value of the winning combination.

In one embodiment, the cards 306, 308, 310, 312, 314 of the first hand 304 are not dealt simultaneously, but to increase player excitement, the cards are dealt one-at-a-time, for example, from left to right. Also, a card can be duplicated after being dealt. For example, the first card 306 is dealt. If it is a two-of-hearts, it will not be duplicated into the second hand 318; instead, the second card 308 is dealt. If the second card 308 is another two-of-hearts, the first and second cards 306, 308 are duplicated into the second hand 318. Then, the outcome of the third card 310 is determined. If it is a king-of-spades, it is not duplicated into the second hand 318; instead, the fourth card 312 is determined. The game proceeds as already described with cards being duplicated into the second hand 318 substantially immediately after being determined. Cards that are undetermined are left blank or "turned-over" on the display 302. Furthermore, sound, illumination and a change in color may accompany the occurrence of a card to be carried over.

As shown above, the cards that are carried over from the first hand 304 are automatically determined by the microprocessor in accordance with winning outcomes shown in a pay table 332. In another embodiment, the decision to carry over certain cards is performed manually by the player by pressing hold buttons 334 to hold certain cards. The hold button 334 can be pressed for cards as they are dealt one-at-a-time, or the hold button 334 can be pressed for cards to be carried over after all the entire hand has been dealt. An additional button (not shown), such as a "don't hold" button may be required to inform the microprocessor of the player's decision.

Figure 11:
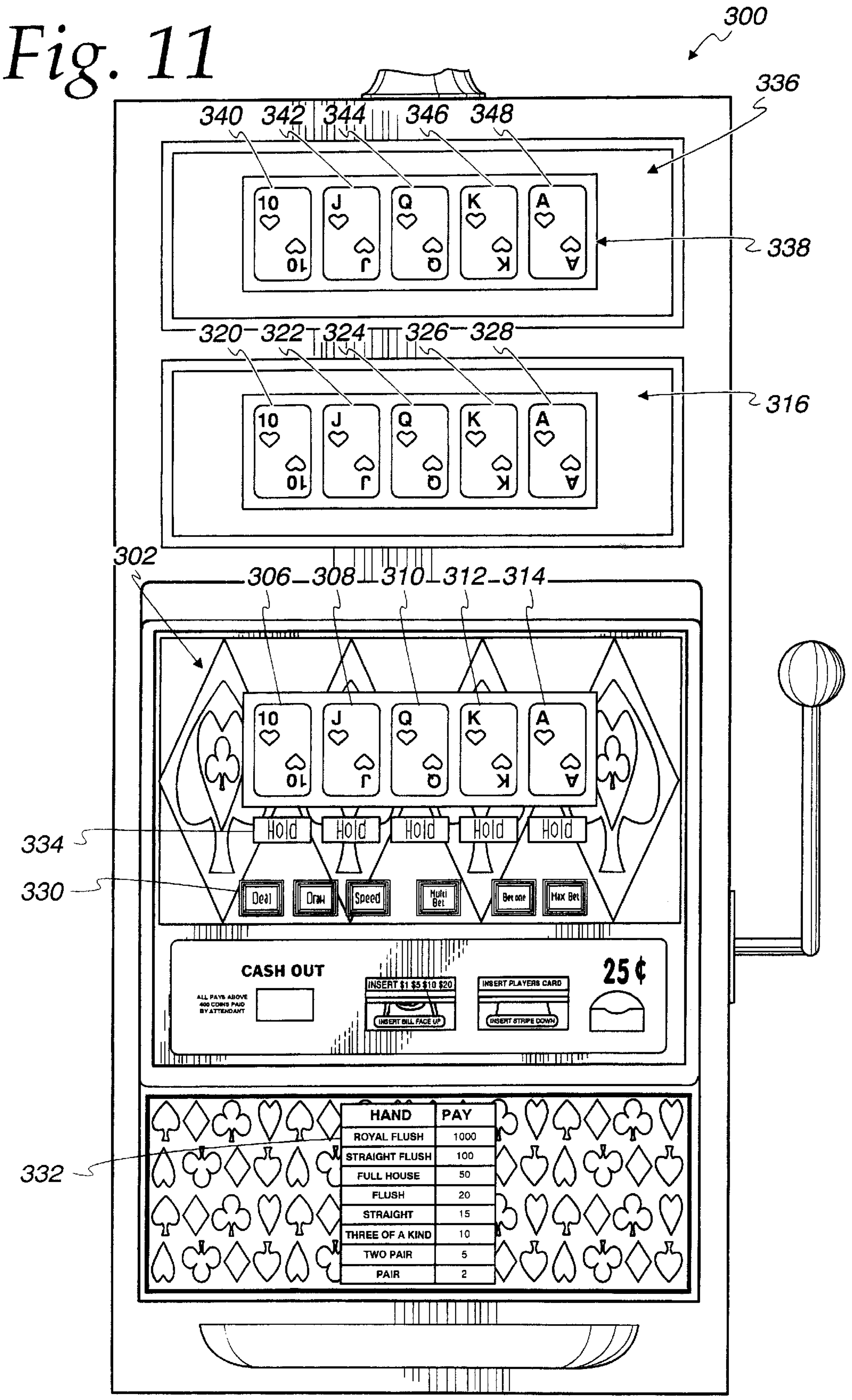
FIG. 11 shows another embodiment of a video gaming machine adapted for playing a card game having three hands.

Referring now to FIG. 11, there is shown yet another embodiment of the invention where at least two hands of cards are employed. In addition to a first and second displays 302, 316, the gaming machine 300 includes at least a third display 336. The third display 336 includes a depiction of a third hand 338 including a first card 340, a second card 342, a third card 344, a fourth card 346 and a fifth card 348. While the number of cards comprising the third hand 338 is preferably the same as in the first hand 304, the invention is not so limited and the third hand 338 may contain a lesser or greater number of cards than the first hand 304. The invention is not limited to the number of displays or hands that can be employed.

Game play is initiated by inserting a number of coins or playing a number of credits which causes the microprocessor to activate a number of hands corresponding to the number of coins or credits played. For example, one coin or credit will activate one hand and the player can buy additional hands by inserting a corresponding number of coins or credits. Alternatively, a certain number of coins or credits will entitle the player to a predetermined number of hands.

In one embodiment, the second and third hands 318, 338 are linked such that cards of the first hand 304 are carried over to the second hand 318 in the same fashion described above and then carried over from the second hand 318 to the third hand 338 also in the same fashion as described above. For example, if the number of cards that are carried over is less than the number of cards in a hand (e.g. a winning combination comprising less than five cards such as a pair, two-pair, three-of-a-kind or a single "wild" card), then it is carried over to the second hand 318. Those cards that are not used to duplicate the carried over cards are depicted as blank or as being turned-over until the microprocessor determines their outcomes. For example, if a two-pair is carried over to the second hand 318 from the first hand 304, then the third, fourth and fifth cards 324, 326, 328 are determined. If the outcome of the second hand 318 then results in a three-of-a-kind, then those cards are carried over to the third hand 338. The fourth and fifth cards 326, 328 are then determined. As a result, the player has two opportunities to improve upon the carried over cards in addition to receiving at least a triple payout on a winning combination achieved in the first hand 304 if one is achieved therein.

In another embodiment, the undetermined cards of the third hand 338 are determined independently of the second hand 318. For example, if the number of cards that are carried over is less than the number of cards in a hand (e.g. a winning combination comprising less than five cards such as a pair, two-pair, three-of-a-kind or a single "wild" card), then it is duplicated into the second hand 318 and third hand 338 and the outcome of any cards in the second hand 318 not used to host carried over cards are determined independently of any cards in the third hand 338 not used to host carried over cards. For example, if a two-pair is achieved in the first hand 304, illustrative outcomes for the second and third hands 318, 338, respectively, are two-pair and a full-house, for example.

In another example and in a manner already described above, if no winning combination results in the first hand 304, then there is no duplication of cards into the second and third hands 318, 338 and the second and third hands 318, 338 are determined independently of each other. Alternatively, the outcome of the second hand 318 is determined such that predetermined cards resulting therein are duplicated into the third hand 338. The player, as a result, has an opportunity to improve upon the carried over cards of the second hand 318 in addition to receiving at least a double payout if a winning combination is carried over from the second hand 318.

In yet another example, if the outcome of the first hand 304 is a winning combination comprising five cards (e.g. a royal flush or a straight flush), then. the winning combination is duplicated into both the second and third hands 318, 338. As a result, the player receives a payout three times the amount of the winning combination.

While the present invention has been described with reference to one or more particular embodiments, those skilled in the art will recognize that many changes may be made thereto without departing from the spirit and scope of the present invention. While the invention is shown with respect to video versions of poker, bingo and keno, the present invention can be applied to other games as well, such as different versions of poker, blackjack, and twenty-one. Each of these embodiments and obvious variations thereof is contemplated as falling within the spirit and scope of the claimed invention, which is set forth in the following claims.

What is claimed is:

1. An electronic video gaming machine controlled by a processor in response to a wager, said gaming machine comprising:

a first set of game elements for playing a game having a plurality of possible game outcomes, said possible game outcomes including at least one predetermined carry-over outcome, said first set having a first game outcome selected by the processor from said plurality of possible game outcomes; and at least a second set of game elements having a second game outcome, wherein in response to said carry-over outcome occurring in said first game outcome, one or more of said game elements of said first set are automatically duplicated by the processor into said second game outcome and said second game outcome is determined, said duplicated game elements being selected by said processor in accordance with a game program and not being manually selected by a player.

2. The electronic video gaming machine of claim 1 wherein said game elements of said first set are determined one at a time.

3. The electronic video gaming machine of claim 2 wherein said one or more of said game elements of said first set are duplicated into said second game outcome substantially immediately after being determined.

4. The electronic video gaming machine of claim 2 wherein said one or more of said game elements of said first set are duplicated into said second game outcome after all of said game elements of said first set are determined.

5. The electronic video gaming machine of claim 1 wherein said carry-over outcomes are displayed on a pay table.

6. The electronic video gaming machine of claim 1 further including a third set of game elements having a third game outcome.

7. The electronic video gaming machine of claim 6 wherein said one or more of said game elements of said first set are automatically duplicated into said third game outcome and said third game outcome is determined.

8. The electronic video gaming machine of claim 6 wherein in response to said carry-over outcome occurring in said second game outcome, one or more of said game elements of said second set are automatically duplicated by the processor into said third game outcome and said third game outcome is determined.

9. The electronic video gaming machine of claim 6 further including a fourth set of game elements having a fourth game outcome.

10. The electronic video gaming machine of claim 9 wherein one or more of said game elements of said first set are automatically duplicated into said fourth game outcome and said fourth game outcome is determined.

11. The electronic video gaming machine of claim 9 wherein in response to said carry-over outcome occurring in said third same outcome, one or more of said game elements of said third set are automatically duplicated by the processor into said fourth game outcome and said fourth game outcome is determined.

12. The electronic video gaming machine of claim 1 wherein said game is selected from a group consisting of a card game, a reel-type slot game, bingo and keno.

13. The electronic video gaming machine of claim 12 wherein said game is a reel-type slot machine, said first set of game elements being a first set of reels bearing symbols, said first set of reels including at least three reels and at least one pay line, said first game outcome corresponding to said symbols appearing along said pay line.

14. The electronic video gaming machine of claim 13 wherein said second set of gaming elements is a second set of reels bearing symbols for playing a reel-type slot game, said second set of reels including at least three reels and at least one pay line, wherein at least one of said symbols of said first game outcome corresponding to said carry-over outcome are duplicated into said pay line of said second set of reels, said second game outcome corresponding to said symbols appearing along said pay line of said second set of reels.

15. The electronic video gaming machine of claim 12 wherein said game is a card game, said first set of gaming elements being a first hand of cards for playing a card game, wherein cards are dealt into said first hand to determine said first game outcome, said second set of gaming elements being a second hand for playing the card game.

16. The electronic video gaming machine of claim 1 further including a plurality of sets of game elements arranged in a stack from a top end to a bottom end such that a face of said set of game elements at said top end is substantially visible and a face of said set of game elements at said bottom end is substantially hidden.

17. A method for playing an electronic video gaming machine, comprising:

providing a first set of game elements for playing a game having a plurality of possible game outcomes, said possible game outcomes including at least one predetermined carry-over outcome, said first set having a first game outcome selected by a processor from said plurality of possible game outcomes;

providing at least a second set of game elements having a second game outcome;

determining said first game outcome of said first set;

determining whether said first game outcome includes said predetermined carry-over outcome;

in response to said carry-over outcome occurring in said first game outcome, automatically duplicating one or more of said game elements of said first set into said second game outcome, said duplicated game elements being selected by said processor in accordance with a game program and not being manually selected by a player;

determining said second game outcome of said second set; and determining a payout amount.

18. The method of claim 17 wherein said step of determining said first game outcome of said first set includes determining said game elements of said first set one at a time.

19. The method of claim 18 wherein said steps of determining whether said first game outcome includes said predetermined carry-over outcome and automatically duplicating said one or more of said game elements of said first set into said second game outcome are performed substantially immediately after each of said game elements of said first set are determined.

20. The method of claim 17 wherein said step of determining said first game outcome of said first set includes determining said game elements of said first set at substantially the same time.

21. The method of claim 17 further including the steps of:

providing a third set of game elements having a third game outcome;

in response to said carry-over outcome occurring in said first game outcome, automatically duplicating said one or more of said game elements of said first set into said third game outcome; and determining said third game outcome of said third set.

22. The method of claim 21 wherein said step of automatically duplicating said one or more of said game elements of said first set into said third game outcome is performed substantially at the same time as said step of automatically duplicating said one or more of said game elements of said first set into said second game outcome.

23. The method of claim 21 wherein said step of determining said third game outcome of said third set includes the step of determining said game elements of said third set that are not duplicated from said first set.

24. The method of claim 21 further including the steps of:

providing a fourth set of game elements having a fourth game outcome;

in response to said carry-over outcome occurring in said first game outcome, automatically duplicating said one or more of said game elements of said first set into said fourth game outcome; and determining said fourth game outcome of said fourth set.

25. The method of claim 24 wherein said step of automatically duplicating said one or more of said game elements of said first set into said fourth game outcome is performed substantially at the same time as said step of automatically duplicating said one or more of said game elements of said first set into said second game outcome.

26. The method of claim 24 wherein said step of determining said fourth game outcome of said fourth set includes the step of determining said elements of said fourth set that are not duplicated from said first set.

27. The method of claim 17 further including the steps of:

providing a third set of game elements having a third game outcome;

determining whether said second game outcome includes said carry-over outcome;

in response to said carry-over outcome occurring in said second game outcome, automatically duplicating one or more of said same elements of said second set into said third game outcome; and determining said third game outcome of said third set.

28. The method of claim 27 wherein said step of determining said third game outcome of said third set includes the step of determining said elements of said third set that are not duplicated from said second set.

29. The method of claim 27 wherein said step of automatically duplicating said one or more of said game elements of said second set into said third game outcome is performed substantially immediately after said step of determining whether said second game outcome includes said carry-over outcome.

30. The method of claim 27 further including the steps of:

providing a fourth set of game elements having a fourth game outcome;

determining whether said third game outcome includes said carry-over outcome;

in response to said carry-over outcome occurring in said third game outcome, automatically duplicating one or more of said game elements of said third set into said fourth game outcome; and determining said fourth game outcome of said fourth set.

31. The method of claim 30 wherein said step of determining said fourth game outcome of said fourth set includes the step of determining said elements of said fourth set that are not duplicated from said third set.

32. The method of claim 30 wherein said step of automatically duplicating said one or more of said game elements of said third set into said fourth game outcome is performed substantially immediately after said step of determining whether said third game outcome includes said carry-over outcome.

33. The method of claim 17 wherein said game is selected from a group consisting of a card game, a reel-type slot game, bingo and keno.

34. The method of claim 33 wherein said game is a card game, said first set of game elements being a first hand of cards for playing said card game, said second set of game elements being a second hand of cards.

35. The method of claim 33 wherein said game is a reel-type slot game, said first set of game elements being a first set of reels bearing symbols having at least three reels and at least one pay line, said second set of game elements being a second set of reels bearing symbols having at least three reels and a pay line.

36. The method of claim 17 further including providing a display on a video screen including said sets of game elements arranged in a stack from a top end to a bottom end such that a face of said set of game elements at said top end is substantially visible and a face of said set of game elements at said bottom end is substantially hidden.

37. An electronic video gaming machine controlled by a processor in response to a wager, said gaming machine comprising a visual display showing a plurality of game boards arranged in a stack from a top end to a bottom end such that a face of said game board at said top end is substantially visible and a face of said game board at said bottom end is substantially hidden, each of said game boards bearing a plurality of playable game elements of a respective game to be played by the processor to determine a respective game outcome, said game outcome being selected from a plurality of possible game outcomes.

38. An electronic video gaming machine of claim 37 wherein one or more of said game elements on one of said game boards are duplicated into all of said remaining game boards.

39. An electronic video gaming machine of claim 38 wherein said game is selected from the group consisting of poker, blackjack, twenty-one, keno and bingo, said duplicated game elements being selected by the processor in accordance with a game program and not being manually selected by a player.

40. An electronic video gaming machine of claim 38 wherein said game is selected from the group consisting of bingo and keno, said duplicated game elements being manually selected by a player.

41. An electronic video gaming machine of claim 37 wherein one or more of said game elements on a preceding game board are duplicated into a subsequent game board.

42. An electronic video gaming machine of claim 41 wherein said game is selected from the group consisting of poker, blackjack, twenty-one, keno and bingo, said duplicated game elements being selected by the processor in accordance with a game program and not being manually selected by a player.

43. An electronic video gaming machine of claim 41 wherein said game is selected from the group consisting of bingo and keno, said duplicated game elements being manually selected by a player.

44. An electronic video gaming machine of claim 38 wherein said duplicated game elements are displayed on a pay table.

45. An electronic video gaming machine of claim 37 wherein said game is selected from the group consisting of poker, blackjack, twenty-one, bingo and keno.

46. An electronic video gaming machine controlled by a processor in response to a wager, said gaming machine comprising a visual display showing a plurality of game boards arranged in a stack from a top end to a bottom end such that a face of said game board at said top end is substantially visible and a face of said game board at said bottom end is substantially hidden, each of said game boards bearing a plurality of playable game elements of a respective game to be played by the processor to determine a respective game outcome, said game outcome being selected from a plurality of possible game outcomes. wherein each game board with a winning game outcome is displayed on the visual display such that said winning game board appears to pop up from said stack so that said face of said winning game board is more visible than before said winning game board popped up from said stack.

47. An electronic video gaming machine of claim 37 wherein said games on said respective game boards are the same.

48. An electronic video gaming machine controlled by a processor in response to a wager, said gaming machine comprising a visual display showing a plurality of game boards arranged in a stack from a top end to a bottom end such that a face of said game board at said top end is substantially visible and a face of said game board at said bottom end is substantially hidden, each of said game boards bearing a plurality of playable game elements of a respective game to be played by the processor to determine a respective game outcome, said game outcome being selected from a plurality of possible game outcomes, wherein said stack of game boards is displayed on the visual display in a substantially three-dimensional top perspective view such that said game boards adjacent to said top end appear larger relative to said game boards adjacent to said bottom end.

49. An electronic video gaming machine of claim 37 wherein said games on said respective game boards are played substantially simultaneously.

50. A method for playing a video gaming machine controlled by a processor in response to a wager, comprising:

providing a plurality of game boards arranged in a stack from a top end to a bottom end such that a face of said game board at said top end is substantially visible and a face of said game board at said bottom end is substantially hidden;

providing games on said game boards to be played in said stack, each of said game boards bearing a plurality of playable game elements; and playing said games to determine respective game outcomes for said respective game boards, said game outcomes being selected from a plurality of possible game outcomes.

51. The method of claim 50 further including the step of duplicating one or more of said game elements on one of said game boards into the remaining game boards.

52. The method of claim 51 wherein said games are selected from the group consisting of a reel-type slot game, poker, blackjack, twenty-one, keno and bingo, said step of duplicating said one or more of said game elements including selecting said one or more of said game elements for duplication in accordance with a game program executed by the processor.

53. The method of claim 51 wherein said games are selected from the group consisting of bingo and keno, said step of duplicating said one or more of said game elements including selecting said one or more of said game elements for duplication in accordance with manual selections by a player using an input device.

54. The method of claim 50 further including the step of duplicating one or more of said game elements on a preceding game board into a subsequent game board.

55. The method of claim 54 wherein said games are selected from the group consisting of a reel-type slot game, poker, blackjack, twenty-one, keno and bingo, said step of duplicating said one or more of said game elements including selecting said one or more of said game elements for duplication in accordance with a game program executed by the processor.

56. The method of claim 54 wherein said games are selected from the group consisting of bingo and keno, said step of duplicating said one or more of said game elements including selecting said one or more of said game elements for duplication in accordance with manual selections by a player using an input device.

57. The method of claim 50 wherein said games are selected from the group consisting of a reel-type slot game, poker, blackjack, twenty-one, bingo and keno.

58. The method of claim 50 further including the step of identifying each game board with a winning game outcome.

59. A method for playing a video gaming machine controlled by a processor in response to a wager, comprising:

providing a plurality of game boards arranged in a stack from a top end to a bottom end such that a face of said game board at said top end is substantially visible and a face of said game board at said bottom end is substantially hidden;

providing games on said game boards to be played in said stack, each of said game boards bearing a plurality of playable game elements;

playing said games to determine respective game outcomes for said respective game boards, said game outcomes being selected from a plurality of possible game outcomes; and identifying each game board with a winning game outcome by causing said game board with said winning outcome to pop-up from said stack in cash-register-like fashion such that said face of said game board with said winning game outcome is more visible than prior to said game board popping up.

60. The method of claim 59 wherein said step of identifying each game board with a winning game outcome includes successively identifying each winning game board from said bottom end of said stack towards said top end or vice versa.

61. The method of claim 50 wherein said step of providing games on each of said respective game boards to be played in said stack further includes providing the same games on all of said game boards to be played in said stack.

62. A method for playing a video gaming machine controlled by a processor in response to a wager, comprising:

providing a plurality of game boards arranged in a stack from a top end to a bottom end such that a face of said game board at said top end is substantially visible and a face of said game board at said bottom end is substantially hidden;

providing games on said game boards to be played in said stack, each of said game boards bearing a plurality of playable game elements;

playing said games to determine respective game outcomes for said respective game boards, said game outcomes being selected from a plurality of possible game outcomes; and displaying said stack of said game boards in a substantially three-dimensional top perspective view such that said game boards adjacent said top end appear larger relative to said game boards adjacent to said bottom end.

63. A method of playing bingo on an electronic video gaming machine, said method comprising:

receiving a wager from a player;

displaying first and second bingo game boards on a visual display, said first and second game boards including respective first and second arrays of pre-selected numbers;

duplicating at least a portion of the pre-selected numbers in said first array into said second array;

calling a group of numbers and designating those pre-selected numbers in said first array which coincide with one of said randomly-called numbers; and awarding a payoff if said designated pre-selected numbers in said first array form a predetermined pattern.

64. The method of claim 63, further including:

calling a second group of numbers and designating those pre-selected numbers in said second array which coincide with one of said called numbers of said second group; and awarding a second payoff if said designated pre-selected numbers in said second array form a second predetermined pattern.

65. The method of claim 64, wherein at least some of said called numbers of said second group correspond to some of said randomly called numbers of said first group.

66. The method of claim 64, wherein said second predetermined pattern is different from said predetermined pattern.

67. A method of playing bingo on an electronic video gaming machine, said method comprising:

receiving a wager from a player;

displaying first and second bingo game boards on a visual display said first and second game boards including respective first and second arrays of pre-selected numbers;

duplicating at least a portion of the pre-selected numbers in said first array into said second array;

selecting a pattern including certain ones of the pre-selected numbers in said first array, said pattern being selected by a player or a game processor;

duplicating said pattern onto said second game board;

randomly calling a group of numbers and designating those pre-selected numbers in said first array which coincide with one of said randomly-called numbers; and awarding a payoff if said designated pre-selected numbers in said first array form said pattern.

68. A method of playing bingo on an electronic video gaming machine, said method comprising:

receiving a wager from a player;

displaying first and second bingo game boards on a visual display, said first and second game boards including respective first and second arrays of pre-selected numbers;

duplicating at least a portion of said pre-selected numbers in said first array into said second array;

selecting a first pattern including certain ones of the pre-selected numbers in said first array;

selecting a second pattern including certain ones of the pre-selected numbers in said second array;

randomly calling a group of numbers and designating those pre-selected numbers in said first and second arrays which coincide with one of said randomly-called numbers;

awarding a first payoff if said designated pre-selected numbers in said first array form said first pattern; and awarding a second payoff if said designated pre-selected numbers in said second array form said second pattern.

69. A method of playing keno on an electronic video gaming machine, said method comprising:

receiving a wager from a player;

displaying first and second keno game boards on a visual display, said first and second game boards each including a field of numbers;

selecting a first set of lucky numbers and designating those numbers of said field on said first game board which coincide with one of said lucky numbers of said first set;

selecting a second set of lucky numbers and designating those numbers of said field on said second game board which coincide with one of said lucky numbers of said second set;

randomly selecting a first set of winning numbers from said field of numbers and identifying those designated numbers of said field on said first game board which match one of said winning numbers of said first set;

selecting a second set of winning numbers from said field of numbers and identifying those designated numbers of said field on said second game board which match one of said winning numbers of said second set, at least some of said winning numbers of said second set corresponding to some of said winning numbers of said first set;

awarding a first payoff based on a quantity of the designated numbers of said field on said first game board which match one of said winning numbers of said first set; and awarding a second payoff based on a quantity of the designated numbers of said field on said second game board which match one of said winning numbers of said second set.

70. The method of claim 69, wherein at least some of said lucky numbers of said second set correspond to some of said lucky numbers of said first set.

71. An electronic video gaming machine controlled by a processor in response to a wager, said gaming machine comprising a visual display showing a plurality of game boards arranged in a stack from a top end to a bottom end, each of said game boards bearing one or more playable game elements of a respective game to be played by the processor to determine a respective game outcome, said game outcome being selected from a plurality of possible game outcomes, said one or more playable game elements on said game board at said top end being substantially visible, said one or more playable game elements of said game board at said bottom end being substantially hidden such that numerical values of said one or more playable game elements of said game board at said bottom end are hidden.

72. An electronic video gaming machine controlled by a processor in response to a wager, said gaming machine comprising a visual display showing a plurality of game boards arranged in a stack from a top end to a bottom end, each of said game boards bearing one or more playable game elements of a respective game to be played by the processor to determine a respective game outcome, said game outcome being selected from a plurality of possible game outcomes, said one or more playable game elements on said game board at said top end being substantially visible, said one or more playable game elements of said game board at said bottom end being entirely hidden.

73. An electronic video gaming machine controlled by a processor in response to a wager, said gaming machine comprising a visual display showing a plurality of game boards arranged in a stack from a top end to a bottom end, each of said game boards bearing one or more playable game elements of a respective game to be played by the processor to determine a respective game outcome, said game outcome being selected from a plurality of possible game outcomes, said game board at said top end substantially overlaying and appearing larger than an adjacent one of said game boards.

74. An electronic video gaming machine controlled by a processor in response to a wager, said gaming machine comprising a visual display showing at least ten game boards arranged in a stack from a top end to a bottom end, each of said game boards bearing one or more playable game elements of a respective game to be played by the processor to determine a respective game outcome, said game outcome being selected from a plurality of possible game outcomes, said one or more playable game elements on said game board at said top end being substantially visible, said one or more playable game elements of said game board at said bottom end being substantially hidden.

75. A method for playing an electronic video gaming machine, comprising:

providing a visual display showing a plurality of game boards, each of said game boards bearing one or more playable game elements of a respective game of chance;

separating said plurality of game boards into at least first and second sets in response to selection by a player of a number of game boards to be included in each of said first and second sets;

receiving a first wager for playing said games on a first set of said game boards;

receiving a second wager for playing said games on a second set of said game boards, said second wager being different from said first wager;

playing said games on said first set of said game boards in response to said first wager;

playing said games on said second set of said game boards in response to said second wager; and awarding a payoff if any of said games on said first and second sets of said game boards generate a winning outcome.

76. An electronic video gaming machine controlled by a processor, comprising a visual display showing a plurality of game boards, each of said game boards bearing one or more playable game elements of a respective game of chance to be played by the processor to determine a respective game outcome, said game outcome being selected from a plurality of possible game outcomes, said plurality of game boards being separable into at least first and second sets, a number of said game boards in each of said first and second sets being selectable by a player, said games on said game boards in said first set being played in response to a first wager, said games on said game boards in said second set being played in response to a second wager, said second wager being different from said first wager.

* * * * *

UNITED STATES PATENT AND TRADEMARK OFFICE

CERTIFICATE OF CORRECTION

PATENT NO.: 6,159,095

DATED: December 12, 2000

INVENTOR(S): Frohm et al.

It is certified that errors appear in the above-identified patent, and that said Letters Patent is hereby corrected as shown below.

Column 19, claim 11, line 18, delete "same" and insert --game--

Column 24, claim 67, line 64, after "display" insert --,--

Signed and Sealed this

Twenty-ninth Day of May, 2001

Attest:

Nicholas P. Godici

NICHOLAS P. GODICI

Attesting Officer

*Acting Director of the United States Patent and Trademark Office*